US011709753B2

(12) United States Patent
De Vansa Vikramaratne et al.

(10) Patent No.: US 11,709,753 B2
(45) Date of Patent: Jul. 25, 2023

(54) PRESENTING COLLABORATION ACTIVITIES

(71) Applicant: Box, Inc., Redwood City, CA (US)

(72) Inventors: Victor De Vansa Vikramaratne, Sunnyvale, CA (US); Sesh Jalagam, Union City, CA (US)

(73) Assignee: Box, Inc., Redwood City, CA (US)

( * ) Notice: Subject to any disclaimer, the term of this patent is extended or adjusted under 35 U.S.C. 154(b) by 45 days.

(21) Appl. No.: 16/136,196

(22) Filed: Sep. 19, 2018

(65) Prior Publication Data
US 2019/0108114 A1    Apr. 11, 2019

Related U.S. Application Data

(63) Continuation-in-part of application No. 15/728,486, filed on Oct. 9, 2017, now Pat. No. 11,030,223.
(Continued)

(51) Int. Cl.
*G06F 11/34*    (2006.01)
*G06Q 50/00*    (2012.01)
(Continued)

(52) U.S. Cl.
CPC ...... *G06F 11/3438* (2013.01); *G06F 11/3072* (2013.01); *G06F 11/3086* (2013.01);
(Continued)

(58) Field of Classification Search
CPC .......... G06F 3/048; G06F 11/00; G06F 16/00; G06F 21/00; G06F 2221/00;
(Continued)

(56) References Cited

U.S. PATENT DOCUMENTS 7,039,642 B1    5/2006  Horvitz et al.
7,669,123 B2    2/2010  Zuckerberg et al.
(Continued)

OTHER PUBLICATIONS

"Activity Stream—Wikipedia", URL:https://en.wikipedia.org/wiki/Activily_stream, Oct. 28, 2019.
(Continued)

*Primary Examiner* — Beau D Spratt
(74) *Attorney, Agent, or Firm* — Vista IP Law Group, LLP

(57) ABSTRACT

Systems and methods for presenting relevant collaboration activity to a collaboration system user. A method embodiment commences upon identifying user events that correspond to interactions between a plurality of users and collaboration objects. The interactions that had been performed and the collaboration objects are both associated with permissions attributes. The interactions are recorded as event records that include aspects of the permissions attributes. When a user opens a user interface, a set of event records is selected based at least in part on the permissions attributes with respect to the user. The selected set of event records are then used to generate a set of user-specific feed entries corresponding to particular individual ones of the set of event records. Characteristics of the individual event records and/or aggregations of event records are used to prepare user-specific feed entries that are presented in a user interface of a user device.

25 Claims, 12 Drawing Sheets

Related U.S. Application Data

(60) Provisional application No. 62/723,961, filed on Aug. 28, 2018.

(51) Int. Cl.
*G06F 11/30* (2006.01)
*G06F 21/62* (2013.01)
*G06N 20/00* (2019.01)
*G06F 16/901* (2019.01)
*G06F 21/55* (2013.01)

(52) U.S. Cl.
CPC ........ *G06F 16/9024* (2019.01); *G06F 21/552* (2013.01); *G06F 21/6209* (2013.01); *G06N 20/00* (2019.01); *G06Q 50/01* (2013.01); *G06F 2221/2117* (2013.01)

(58) Field of Classification Search
CPC ............. G06F 11/3438; G06F 16/9024; G06F 11/3072; G06F 11/3086; G06F 21/552; H04L 29/06; H04L 67/22; H04L 67/24; G06N 20/00
See application file for complete search history.

(56) References Cited

U.S. PATENT DOCUMENTS

| | | | |
|---|---|---|---|
| 8,381,306 | B2 | 2/2013 | Mcpherson et al. |
| 9,697,210 | B1 | 7/2017 | Lee |
| 9,805,042 | B1 | 10/2017 | Meyer |
| 9,824,094 | B1 | 11/2017 | Meyer |
| 9,990,365 | B1 | 6/2018 | Kilpatrick |
| 10,074,015 | B1 | 9/2018 | Grundmann |
| 10,102,305 | B1* | 10/2018 | Chang ..................... H04L 67/22 |
| 10,218,784 | B2 | 2/2019 | Ju |
| 10,452,993 | B1 | 10/2019 | Hart |
| 10,997,499 | B1 | 5/2021 | Kayyoor et al. |
| 2002/0069360 | A1 | 6/2002 | Thoone et al. |
| 2002/0120734 | A1* | 8/2002 | Riosa ..................... H04L 41/065 709/224 |
| 2004/0054566 | A1 | 3/2004 | J'Maev |
| 2005/0010593 | A1 | 1/2005 | Fellenstein |
| 2005/0235318 | A1 | 10/2005 | Grauch et al. |
| 2006/0161543 | A1 | 7/2006 | Feng |
| 2007/0283443 | A1 | 12/2007 | McPherson |
| 2008/0077462 | A1 | 3/2008 | Patel |
| 2008/0183665 | A1 | 7/2008 | Brinker |
| 2008/0195587 | A1 | 8/2008 | Hussami |
| 2009/0164537 | A1 | 6/2009 | Huang |
| 2009/0248615 | A1 | 10/2009 | Drory |
| 2012/0192086 | A1* | 7/2012 | Ghods ..................... H04L 67/22 715/753 |
| 2012/0233096 | A1 | 9/2012 | Gupta |
| 2012/0297313 | A1* | 11/2012 | Sharma ................. G06Q 10/10 715/751 |
| 2013/0179381 | A1 | 7/2013 | Kawabata |
| 2013/0179799 | A1 | 7/2013 | Savage |
| 2013/0262598 | A1* | 10/2013 | Makanawala ........... H04L 51/32 709/206 |
| 2013/0297689 | A1* | 11/2013 | Bhat .................. G06F 17/2785 709/204 |
| 2013/0311467 | A1 | 11/2013 | Galle et al. |
| 2013/0318593 | A1 | 11/2013 | Smith |
| 2013/0332195 | A1 | 12/2013 | Galuten |
| 2014/0006977 | A1* | 1/2014 | Adams .................... H04L 51/32 715/758 |
| 2014/0081904 | A1* | 3/2014 | Sitrick ................. G06F 17/212 707/608 |
| 2014/0327622 | A1 | 11/2014 | Ouyang |
| 2015/0134693 | A1* | 5/2015 | Chan ..................... H04L 65/403 707/769 |
| 2015/0207701 | A1 | 7/2015 | Faaborg |
| 2015/0331578 | A1* | 11/2015 | Keslin ................. G06F 3/04817 715/751 |
| 2016/0065627 | A1 | 3/2016 | Pearl |
| 2016/0098390 | A1 | 4/2016 | Kitajima |
| 2016/0260336 | A1* | 9/2016 | Chapman ................. G09B 5/00 |
| 2016/0321311 | A1 | 11/2016 | Tallamraju |
| 2016/0373476 | A1* | 12/2016 | Dell'Anno ............ G06F 16/254 |
| 2017/0063818 | A1* | 3/2017 | Niewczas ............. H04L 63/102 |
| 2017/0139550 | A1* | 5/2017 | Milvaney ............. G06F 3/04817 |
| 2017/0168692 | A1 | 6/2017 | Chandra |
| 2017/0185687 | A1* | 6/2017 | Pai ....................... G06Q 10/101 |
| 2017/0277907 | A1* | 9/2017 | Dang .................. G06F 16/9024 |
| 2017/0364568 | A1 | 12/2017 | Reynolds et al. |
| 2018/0032609 | A1 | 2/2018 | Allen et al. |
| 2018/0062852 | A1 | 3/2018 | Schmahmann |
| 2018/0081503 | A1 | 3/2018 | Green et al. |
| 2018/0284959 | A1* | 10/2018 | Alphin, III .............. H04L 67/24 |
| 2018/0349623 | A1 | 12/2018 | Morard et al. |
| 2019/0130031 | A1* | 5/2019 | Gourley ................ G06F 16/953 |

OTHER PUBLICATIONS

Tata, Sandeep, et al. "Quick access: building a smart experience for Google drive." Proceedings of the 23rd ACM SIGKDD International Conference on Knowledge Discovery and Data Mining. ACM, 2017.

Non-Final Office Action dated Mar. 20, 2020 for U.S. Appl. No. 16/264,357.

Final Office Action dated Sep. 30, 2019 for U.S. Appl. No. 15/728,486.

Non-Final Office Action dated May 30, 2019 for U.S. Appl. No. 15/728,486.

Non-Final Office Action dated Dec. 12, 2019 for U.S. Appl. No. 16/136,200.

Non-Final Office Action dated Apr. 29, 2020 for U.S. Appl. No. 16/136,207.

Final Office Action dated Jul. 13, 2020 for U.S. Appl. No. 16/264,357.

Notice of Allowance for U.S. Appl. No. 16/136,200 dated Jul. 27, 2020.

Final Office Action for U.S. Appl. No. 16/136,207 dated Nov. 9, 2020.

Non-Final Office Action for U.S. Appl. No. 16/264,357 dated Apr. 16, 2021.

Notice of Allowance for U.S. Appl. No. 16/136,207 dated May 13, 2021.

Final Office Action for U.S. Appl. No. 16/264,357 dated Aug. 6, 2021.

Non-Final Office Action for U.S. Appl. No. 15/728,486 dated Jul. 28, 2020.

Non-Final Office Action for U.S. Appl. No. 16/264,357 dated Mar. 11, 2022.

Final Office Action for U.S. Appl. No. 16/264,357 dated Jul. 13, 2022.

Non-Final Office Action for U.S. Appl. No. 16/264,357 dated Nov. 29, 2022.

* cited by examiner

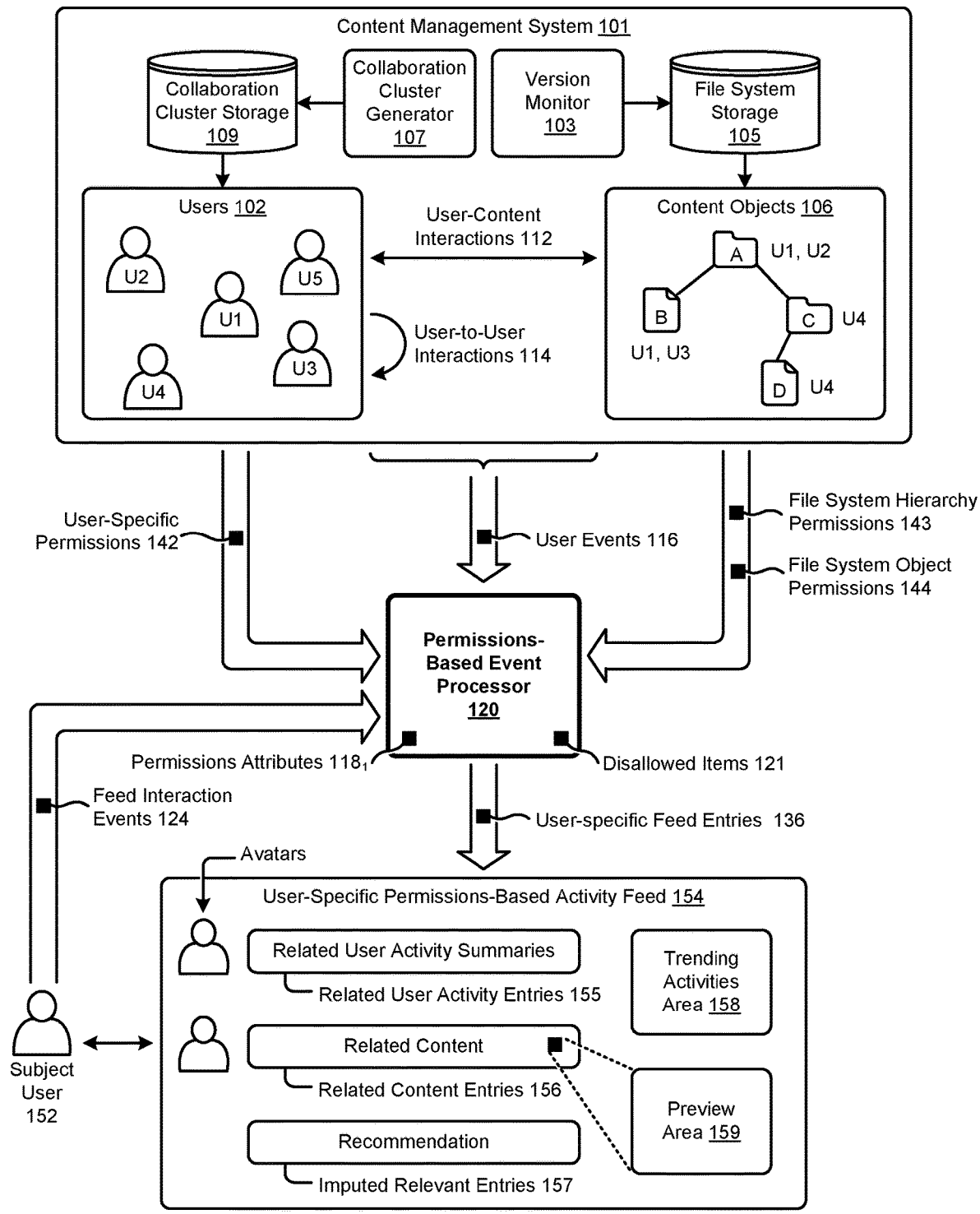
FIG. 1A1

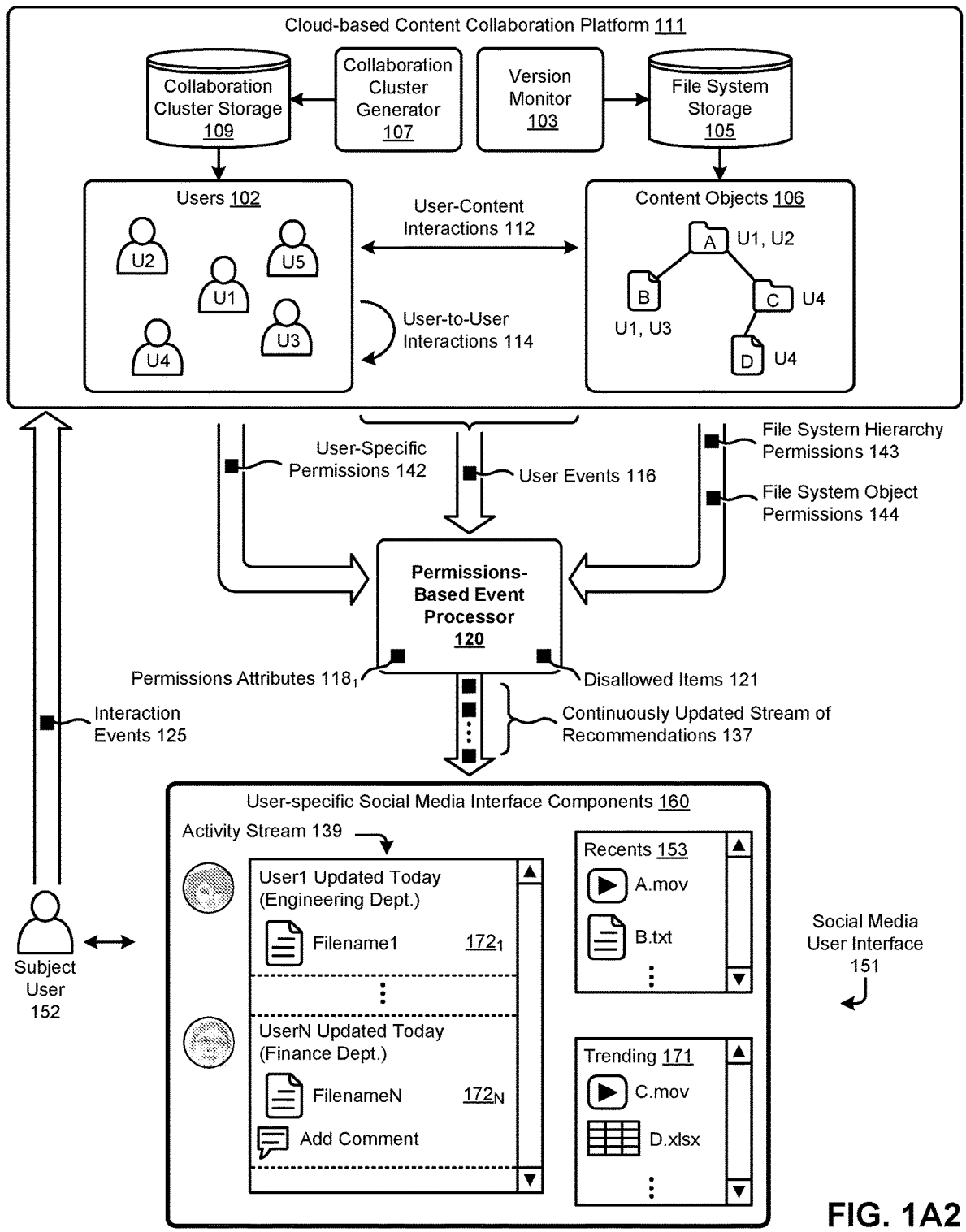
FIG. 1A2

PRESENTING COLLABORATION ACTIVITIES

CROSS-REFERENCE TO RELATED APPLICATION(S)

The present application claims the benefit of priority to U.S. Provisional Patent Application Ser. No. 62/723,961 titled "PRESENTING COLLABORATION ACTIVITIES", filed on Aug. 28, 2018 and is also a continuation-in-part of U.S. patent application Ser. No. 15/728,486 titled "COLLABORATION ACTIVITY SUMMARIES", filed Oct. 9, 2017, which are hereby incorporated by reference in their entirety.

This application is related to U.S. patent application Ser. No. 16/136,200 titled "CURATING COLLABORATION ACTIVITY", filed on Sep. 19, 2018, and U.S. patent application Ser. No. 16/136,207 titled "FILTERING COLLABORATION ACTIVITY", filed on Sep. 19, 2018, which are hereby incorporated by reference in their entirety.

FIELD

This disclosure relates to collaboration systems, and more particularly to techniques for presenting collaboration activities.

BACKGROUND

Enterprises encourage collaboration to boost efficiency, productivity, and creativity. Such collaboration often involves interactions (e.g., authoring, commenting, sharing) by the collaborators over computer-readable content objects (e.g., text files, spreadsheets, mixed text and graphics documents, programming code files, etc.). Collaboration may also involve explicit user-to-user user interactions (e.g., messaging, chatting, object share invitations, etc.) and/or implicit user-to-user relationships (e.g., based on organizational structures). Furthermore, the efficiency, productivity, and creativity benefits of collaboration for a particular user can be enhanced by a knowledge of the activities of other users. Based on the knowledge of such activities, a user might initiate a new collaboration activity (e.g., with a content object, with another user, etc.) that is beneficial to the collaboration activity participants.

Modern enterprises can promote the foregoing collaboration activities by using a distributed computing and storage platform (e.g., a cloud-based content management platform) to efficiently and securely provision content access to various individual users and/or collaborative groups of users. The content management platform may also provision access to certain users or groups of users to facilitate various user-to-user interactions. The content management platform will provision such access (e.g., to content, to users, etc.) in accordance with a set of permissions so as to maintain a secure content management environment and/or to observe sharing rules and/or privacy rules and/or to observe other visibility configurations.

Unfortunately, as the users and/or content objects of an enterprise continue to grow in number, challenges to identifying collaboration activity that is compliant with the permissions of a particular user also grows commensurately. As an example, the users of a user group (e.g., engineering) may collaboratively interact with various content objects to perform certain tasks. However, not all of the users in the user group have permission to access all of the content objects associated with the collaboration activity. Approaches that merely present all of the user group collaboration activity to a particular user in the user group are deficient in offering collaboration activity knowledge that can be actually acted upon by the user while still observing permissions. In some cases, such approaches may result in the user attempting to initiate a new collaboration activity only to be denied access (e.g., to a content object, to a user, etc.) due to the user's permissions. What is needed is an improved way of presenting pertinent collaboration activity to users that have varying access permissions.

SUMMARY

The present disclosure describes techniques used in systems, methods, and in computer program products for presenting collaboration activities on a user device, which techniques advance the relevant technologies to address technological issues with legacy approaches. More specifically, the present disclosure describes techniques used in systems, methods, and in computer program products for presentation of permissions-based collaboration events. Certain embodiments are directed to technological solutions for tracking permissions attributes associated with user collaboration events to generate user-specific permissions-based collaboration activity feeds.

The disclosed embodiments modify and improve over legacy approaches. In particular, the herein-disclosed techniques provide technical solutions that address the technical problems attendant to presenting filtered and ordered collaboration activity messages. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of human-machine interfaces as well as advances in various technical fields related to business-oriented collaboration systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 1A1 and FIG. 1A2 illustrate computing environments in which embodiments of the present disclosure can be implemented.

FIG. 2 depicts a permissions-based collaboration activity presentation technique as implemented in systems that facilitate presentation of permissions-based collaboration events, according to an embodiment.

DETAILED DESCRIPTION

Figure 1B:
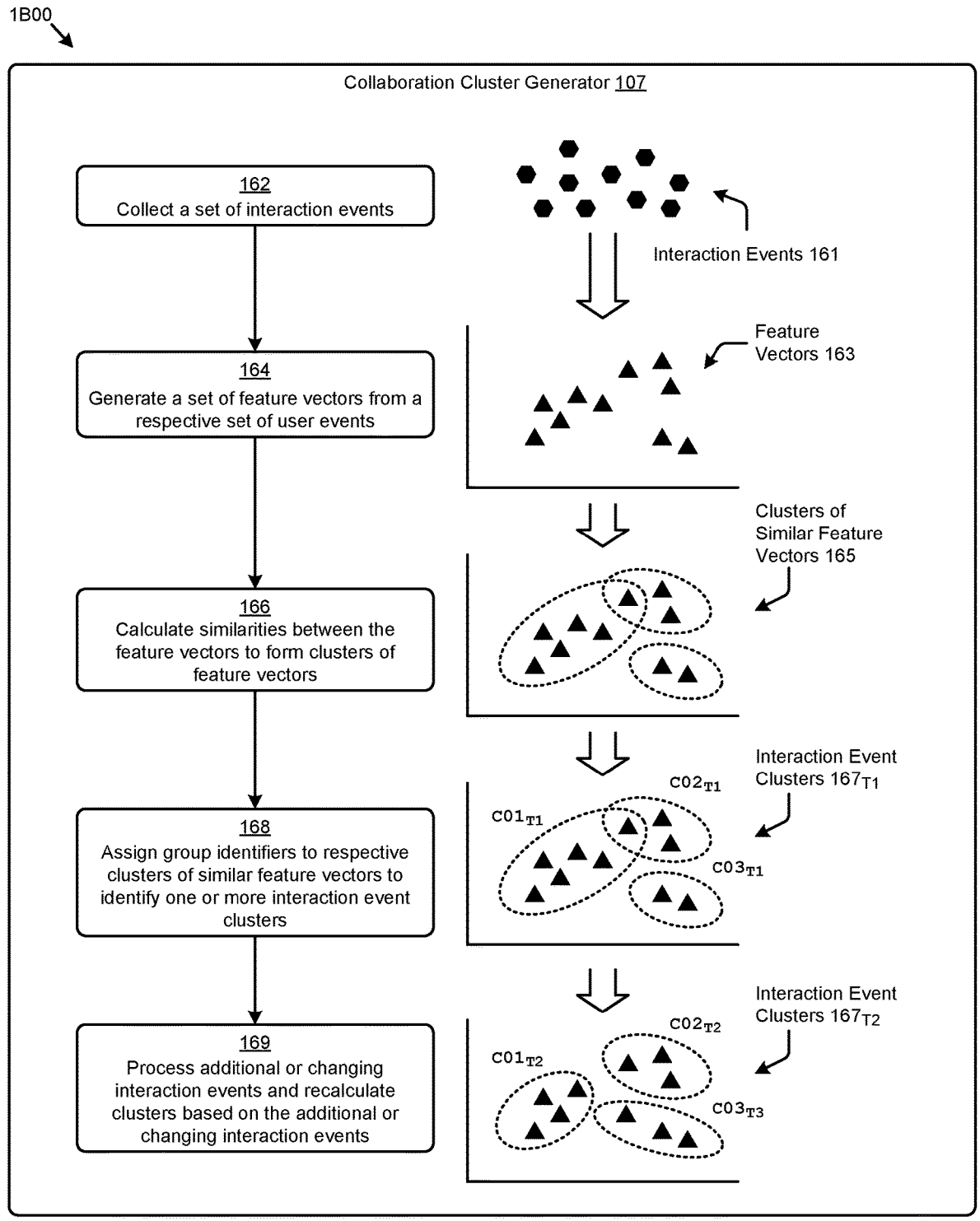
FIG. 1B depicts a collaboration cluster maintenance technique as implemented in systems that facilitate presentation of permissions-based collaboration events, according to an embodiment.

Embodiments in accordance with the present disclosure address the problem of presenting collaboration activity to users that have varying collaboration permissions. Some embodiments are directed to approaches for tracking permissions attributes associated with user collaboration events to generate user-specific permissions-based collaboration activity feeds. The accompanying figures and discussions herein present example environments, systems, methods, and computer program products for presentation of permissions-based collaboration events.

Overview

Disclosed herein are techniques for tracking permissions attributes associated with user collaboration events to generate user-specific permissions-based collaboration activity feeds. In certain embodiments, such techniques are implemented in a content management system that facilitates user-to-user interactions and user-content interactions over a plurality of users and a plurality of content objects in accordance with a set of access permissions (e.g., visibility configurations).

Permissions-based user events that correspond to the user-to-user interactions and/or user-content interactions are captured at the system. A permissions-based user event is performed in accordance with (e.g., permitted by) any number of permissions attributes that are associated with the event objects, which event objects can comprise the users, the content objects, and/or the interactions. Sets of selected user events for respective subject users are selected from the permissions-based user events based at least in part on the permissions attributes associated with the user events.

The selected user events are organized into user-specific instances of an event graph data structure, which are used to generate one or more activity feed entries for each of the users. The activity feed entries are then made available for presentation to their respective users. Such activity feed entries constitute collaboration activity knowledge that complies with the permissions of the respective users. In certain embodiments, the presentation of activity feed entries is adjusted based at least in part on user interactions with earlier presented activity feed entries. In certain embodiments, the foregoing presentation adjustments are based at least in part on a learning model implemented in the system.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 2:
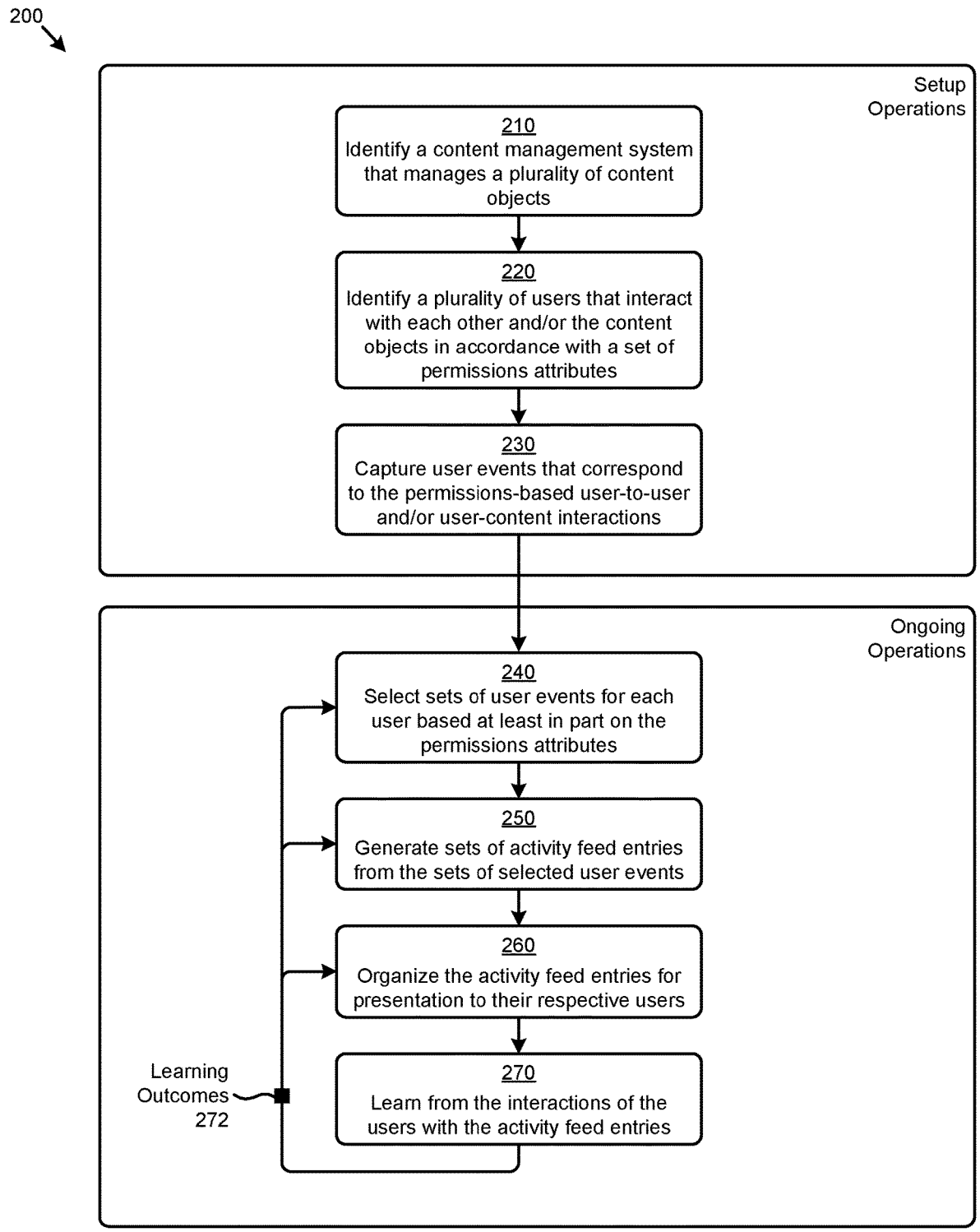

FIG. 1A1 and FIG. 1A2 illustrate computing environments in which embodiments of the present disclosure can be implemented. As an option, one or more variations of the computing environments or any aspect thereof may be implemented in the context of the architecture and functionality of the embodiments described herein.

FIG. 1A1 illustrates how the herein disclosed techniques can be used in a computing environment to derive user-specific activity feeds from various user events that are performed in accordance with (e.g., permitted by) permissions attributes that are associated with the events.

The block diagram of FIG. 1A1 illustrates a plurality of users 102 (e.g., user U1, user U2, user U3, user U4, and user U5) that interact with content objects 106 that are stored and/or managed within a content management system 101. The users interact with each other through occurrences of user-to-user interactions 114. For example, a first user might invite a second user to collaborate on some task and/or might request to join a group of other users. Any of the users 102 might also invoke certain instances of user-content interactions 112 with various instances of content objects 106 (e.g., folder A, file B, folder C, and file D). As an example, a first user might create a document and then share that document with other users for viewing, editing, or commenting by the other users. The efficiency, productivity, and creativity of the users 102 can be enhanced by a knowledge of such collaboration activities (e.g., user-content interactions 112, user-to-user interactions 114, etc.) as performed by other users. Based on the knowledge of such activities, a particular user might initiate a new collaboration activity (e.g., with a content object, with another user, etc.) that is beneficial to the collaboration activity participants.

Interactions between users and content objects often result in new versions of content objects. As shown, content objects (e.g., folders, files) are held in file system storage 105. A version monitor 103 keeps track of changes in or to the content objects. In the context of collaboration activities that are performed over content objects of a content management system 101, users can change/modify content objects at will. In some cases, the same content object can be operated on at the same time by multiple users. As such, many versions of the same content object are created. For example, a first user might make a change to file 'X' at the same time that another user makes a change to the same file 'X'. The version monitor would recognize the first user's edit or change to file 'X' and store a corresponding version of the object in the file storage system. The version monitor would also recognize the other user's edit or change to file 'X' and store yet another version of the object in the file storage system. Any number of concurrent users can make changes to the same file within a particular time window and sets of changes that occur to the file are captured as successive versions of the content object.

Further details regarding general approaches to concurrent editing and capture of successive version are described in U.S. application Ser. No. 15/957,411 titled "CALCULATING AND PRESENTING USER-SPECIFIC DIFFERENCES", filed on Apr. 19, 2018, which is hereby incorporated by reference in its entirety.

Ongoing collaboration might be facilitated by a cloud-based content management platform. Such a cloud-based content management platform might include a content management system 101 that in turn implements techniques for securely provisioning access to the users 102 and/or the content objects 106. One such technique implements a set of user-specific permissions 142 and permission attributes $118_1$ associated with the users 102. The user-specific permissions 142 might be derived from information pertaining to the identification, roles, access levels, groups, and/or other attributes of the users 102. A set of file system hierarchy permissions 143 and/or file system object permissions 144 associated with the content objects 106 might also be implemented.

The file system hierarchy permissions 143 and/or file system object permissions 144 might comprise information pertaining to users (e.g., user identifiers) and/or groups (e.g., group identifiers) that can access the content objects 106. The file system hierarchy permissions 143 and/or file system object permissions 144 may be associated with a particular content object (e.g., only file B) and/or may be associated with a set of content objects (e.g., folder A and file B) that are related in some manner (e.g., hierarchically). In some cases, the file system hierarchy permissions 143 and/or file system object permissions 144 are derived from a hierarchically higher file system object and/or other information such as metadata pertaining to the hierarchically higher file system object. In some cases, the file system hierarchy permissions 143 and/or file system object permissions 144 are derived from the user-specific permissions 142 and/or other information (e.g., a security policy). The user-specific permissions 142 and/or file system hierarchy permissions 143 and/or file system object permissions 144 are consulted individually or in combination to determine whether to allow the performance of the user-to-user interactions 114 and/or user-content interactions 112. For example, a user from a first group (e.g., engineering) may be provisioned access to content objects owned by other users from the first group but may be denied access to content objects owned by users from a second group (e.g., human resources). In some cases, collaboration system files inherit permissions from a containing folder. In other cases, collaboration system files are subject to permissions that are different from their respective containing folders.

Approaches to presenting collaboration activity to users that merely present a listing of files or folders (e.g., recently edited documents) are deficient in offering collaboration activity knowledge that can be actually imparted to a user for interaction by a particular user. As depicted in the select set of content objects 106, for example, the then-current data constituting user-specific permissions 142 and/or file system hierarchy permissions 143 and/or file system object permissions 144 indicate that user U1 and user U2 have access to folder A, user U1 and user U3 have access to file B, and user U4 has access to folder C as well as to file D. Knowledge that user U4 has recently accessed folder C and edited file D is not useful to user U1, since user U1 does not have permission to access either of those content objects. In this case, the efficiency of user U1 may be decreased if user U1 attempts to initiate a new collaboration activity based on the foregoing knowledge only to be denied access to folder C and/or to file D.

The herein disclosed techniques address such issues pertaining to presenting pertinent collaboration activity to users that have varying access permissions. As shown in FIG. 1A1, a permissions-based event processor 120 is implemented to capture a set of user events 116 that correspond to user-to-user interactions 114 and/or user-content interactions 112. The user events 116 can be defined as permissions-based user events in that they are performed in accordance with (e.g., permitted by) the user-specific permissions 142 and/or file system hierarchy permissions 143 and/or file system object permissions 144 that are associated with the event objects, which event objects can relate to the users and/or to the content objects and/or to the relationships between the users and the content objects, and/or any characteristic of any interactions between the users and the content objects.

Sets of user-specific feed entries 136 for a particular subject user 152 are derived from user events 116 based at least in part on the user-specific permissions 142 and/or the file system hierarchy permissions 143 and/or the file system object permissions 144. For example, some of the user-to-user interactions 114 might pertain to content items for which the subject user does not have sufficient permissions to access. Those interactions and/or the content items corresponding to those interactions are deemed as being disallowed items 121. Disallowed items are excluded from consideration when determining the user-specific feed entries 136. As such, only user events associated with content objects that are accessible by a particular subject user will be selected for that particular subject user.

Further details regarding general approaches to filtering content items for which a user does not have sufficient permissions are described in U.S. Application Ser. No. 62/723,913 titled "FILTERING COLLABORATION ACTIVITY", filed on Aug. 28, 2018, which is hereby incorporated by reference in its entirety.

The user-specific feed entries 136 for each particular subject user are organized for presentation into a user-specific permissions-based activity feed 154. As shown, the user-specific permissions-based activity feed includes an area for presenting related user activity summaries, an area for presenting related activity content, and area for presenting recommendations, an area for presenting trending activities (e.g., the shown trending activities area 158) and an area for presenting content previews (e.g., the shown preview area 159).

The area for presenting related user activity summaries comprises one or more related user activity entries 155, the area for presenting related activity content comprises one or more related content entries 156, and the area for presenting recommendations comprises one or more imputed relevant entries 157. The related user activity entries 155, the related content entries 156, and the imputed relevant entries 157 are emitted by the permissions-based event processor 120. More specifically, the permissions-based event processor 120 receives user events 116 and a set of user-specific permissions 142 to determine what interactions (e.g., user-to-user interaction 114 and/or user-content interactions 112) might be applicable to present to a subject user in that user's feed.

As shown, the related content entries 156 includes a preview area 159. The preview area offers the user an opportunity to identify any of the related content entries based on an icon or image that is presented in the preview area. As such, a user can interact with the related content entries, and such user interaction is sent to the permissions-based event processor 120 as one or more feed interaction events 124.

More specifically, the user interacts with a respective activity feed. Such interactions are received as feed interaction events 124 at the permissions-based event processor 120. This feedback can be used to adjust certain processes, such as event selection, event filtering, event sorting, event decoration, and/or other processes.

The user-specific permissions-based activity feed 154 as generated by the herein disclosed techniques constitute collaboration activity knowledge that complies with the permissions of the respective subject users. As such, application of the techniques disclosed herein facilitate improvements in computer functionality that serve to reduce the demand for computer memory, reduce the demand for computer processing power, reduce network bandwidth use, and reduce the demand for inter-component communication. Specifically, consumption of such computing resources to generate, store, present, or otherwise process objects corresponding to feed entries that cannot be acted upon by a subject user (e.g., due to lack of permissions) is eliminated. Furthermore, consumption of computing resources related to unsuccessful attempts (e.g., due to permissions restrictions) to act upon certain collaboration activity knowledge is also eliminated.

Further details regarding general approaches to generating relationships and/or user-oriented networks between sets of collaboration system interaction events are described in U.S. application Ser. No. 15/728,486 titled "COLLABORATION ACTIVITY SUMMARIES", filed on Oct. 9, 2017, which is hereby incorporated by reference in its entirety.

Referring again to components of the content management system 101, specifically, the collaboration cluster generator 107 and collaboration cluster storage 109, these components are used to relate users into dynamically observed collaboration clusters. For example, a first set of users in, for example, the same department might be initially assigned to a first cluster due to performance of interactions over a particular file. At a later moment in time, an Nth user from a different department might also interact with the particular file. In spite of the fact that the Nth user is in a different department, the Nth user might be brought into the first cluster due to the Nth user's interaction with the particular file.

FIG. 1A2 presents details pertaining to the user-specific permissions-based activity feed 154 of FIG. 1A1. Specifically, a collection of user-specific social media interface components 160 are shown and described as pertaining to the manner by which the social media interface components receive real-time streams of entries and the manner by which a user interacts with a content management system such as the shown cloud-based content collaboration platform 111 using such social media interface components.

The collection of user-specific social media interface components 160 includes social media interface components that interfaced to the cloud-based content collaboration platform 111 to receive streams of recommendations that are derived from individual interaction events over content objects of the cloud-based content collaboration platform 111, and/or as derived from related groups of interaction events that occur over content objects within the cloud-based content collaboration platform 111.

Each of the social media interface components are configured to receive a continuously updated stream of recommendations 137, the recommendations comprising trending items (e.g., via the trending item component 171 of the social media interface 151), activity items (e.g., via the activity stream component 139 of the social media interface 151) and recent items (e.g., via the recents stream component 153 of the social media interface 151). Any individual ones from the collection of user-specific social media interface components 160 can receive a respective stream of recommendations (e.g., via real-time streams of events that are specific to a particular social media interface component). In some cases, and as shown, the activity stream component 139 is continuously updated, and serves as a social media formatted feed. As such, activity items within the social media formatted feed correspond to real people. An activity item might be decorated with avatars (e.g., photos or other images) that correspond to the real people. A user can interact (e.g., click on) an avatar from within the social media interface 151 and, responsive to that user interaction, one or more interaction events 125 are generated and communicated to the cloud-based content collaboration platform 111. As another example, a user can interact (e.g., click on) comment icon from within the social media interface 151 and, responsive to that user interaction with the comment icon and/or a comment text box, one or more interaction events 125 are generated and communicated to the cloud-based content collaboration platform 111.

The summary entries (e.g., summary entry $172_1$, . . . , summary entry $172_N$) are displayed in a scrollable region. Each summary entry might include a user identification (e.g., User1, UserN), an indication of the user's enterprise, department or project affiliation (e.g., Engineering Dept, Finance Dept.), a reference to a particular collaboration object (e.g., FilenameN) and in some cases, a summary entry might include additional screen elements that facilitate user interaction. In the example shown, the summary entry for UserN includes an icon pertaining to adding a comment. A plurality of summary entries can be presented in a scrollable region.

A recent documents section 153 displays a series of icons that correspond to user-specific recent collaboration objects of various types. Strictly as examples, a movie file (e.g., A.mov) might be identified by name next to an icon that suggests video media, or a text file (e.g., B.txt) might be identified by name next to an icon that suggests a text document. A user can interact (e.g., right click on) an icon from within the social media interface 151 and, for example, indicate an interest in (e.g., indicate as a favorite). Responsive to that user interaction, one or more interaction events 125 are generated and communicated to the cloud-based content collaboration platform 111.

A trending item component 171 displays a series of icons that correspond to user-specific collaboration objects of various types, which collaboration objects have been viewed or otherwise acted upon by users other than the subject user. The collaboration objects that have a high occurrence of having been viewed or otherwise acted upon by users other than the subject user are presented at the top of the trending item component 171. Strictly as examples, a movie file (e.g., C.mov) might be identified by name next to an icon that suggests video media, or a spreadsheet (e.g., D.xlsx) might be identified by name next to an icon that suggests a spreadsheet.

Any of the aforementioned icons and/or other screen elements of the social media interface can be clicked on, hovered over, or otherwise identified so as to bring up still further screen devices (e.g., a widget or context menu, etc.) that facilitate direct or indirect user interaction with a particular one or more collaboration objects. For example, any given collaboration object might have an associated comment metadata for comments, which comments are not part of the collaboration object itself, but rather, which comments are merely associated with the content object without modification of the collaboration object itself. Using any one or more of a collection of user-specific social media interface components 160, the user can add comment metadata to be associated with the collaboration object. As such a comment can be made over a collaboration object without having to preview or open or download the collaboration object.

In some cases, a user might want to download or share, or add to favorites, or hide, or find out who else can access the collaboration object. To do so, the user can double-click or right mouse click or otherwise invoke a pointing action to identify the icon corresponding to the collaboration object, which identification will bring up a context-sensitive menu. In example cases, such a context-sensitive menu includes options to download or share, or add to favorites, or find out who else can access the collaboration object. Still additional screen elements are used in the display to aid interactivity. For example, a collaboration object, and/or a user's name or avatar, and/or a filename, and/or any other graphical element within the scrollable region of summary entries 172 can be activated by a mouse or pointing device. Activation is context sensitive. A filename might be presented as an HTLM link to the file, an avatar might be associated with an HTML link to the corresponding user's profile or web page, etc.

As such, the scrollable region of summary entries 172, the trending documents section and the recent documents section, either singly or in combination serve to present information to a subject user, which information is in one or more ways relevant to the subject user. Such relevant information is presented in this fashion so as to model familiar screen presentations such as are prevalent in social media user interfaces. In particular, and as shown, the collection of user-specific social media interface components 160 is structured such that the summary entries, recommendations, trending items, favorites, etc. are presented in a manner that is indicative of a social media user interface front-end. Such a layout not only avoids cognitive overload, but also takes advantage of familiarity and expectations that users have of social media interfaces. When a screen area such as the shown collection of user-specific social media interface components 160 is structured similarly to a social media user interface front-end, users freely interact with the items on the screen with an expectation that many options for interactivity are available. When a user takes some sort of action over an item on the screen, aspects of the action are delivered to the cloud-based content collaboration platform as one or more interaction events 125. In some cases, the cloud-based content collaboration platform will process such interaction events 125 so as to generate still further user-specific feed entries 136, which in turn are presented to the user with at least some statistical expectation that any given user-specific entry into a component of the user specific social media interface components 160 in some way relevant to the particular subject user.

Further details regarding general approaches to generating user-specific feed entries are described in U.S. patent application Ser. No. 15/728,486 titled "COLLABORATION ACTIVITY SUMMARIES", filed Oct. 9, 2017, which is hereby incorporated by reference in its entirety.

There are many ways to establish a set of files, and/or folders, and/or other users, and/or any other sorts of collaboration objects that are in some way expected to be relevant to a particular user. Indeed, in collaboration systems such as those discussed herein, there are many such interactions that might relate one user with another user or group of users, and there are many interactions that might relate one user to a particular file or to a particular folder or to some other collaboration object. One mechanism to form relationships is based on information that might be present in user histories or profiles (e.g., enterprise affiliation, department affiliation, project assignments, etc.). Another mechanism to form relationships between users, files, folders and/or other collaboration objects is to form and maintain logical clusters based on observed user activities. One particular technique to form, modify, eliminate and/or otherwise maintain a constituency of clusters is shown and described as pertains to FIG. 1B.

FIG. 1B depicts a collaboration cluster maintenance technique 1B00 as implemented in systems that facilitate presentation of permissions-based collaboration events. In particular, collaboration cluster maintenance technique 1B00 depicts one possible implementation of collaboration cluster generator 107.

The collaboration cluster maintenance technique 1B00 presents one embodiment of certain steps and/or operations that identify groups of interaction events to facilitate the herein disclosed techniques. Various sequences are presented to illustrate collaboration cluster maintenance technique 1B00. As shown, the collaboration cluster maintenance technique 1B00 commences by collecting a plurality of interaction events 161 to be stored in a data structure (step 162). The data structure can be initialized to form an event group data structure that in turn can be populated and stored persistently or ephemerally in persistent or non-persistent memory.

A set of feature vectors are generated from a respective set of collaboration system interaction events (step 164). As illustrated, for example, the feature vectors 163 might be determined based on characteristics of interaction events 161. More specifically, each one of the feature vectors 163 corresponds to a set of characteristics of a respective one of the interaction events 161 and comprises attributes associated with the particular event. Using machine learning system components (e.g., classifiers, support vector machines, etc.), similarities between the feature vectors are calculated (step 166) to form one or more clusters of similar feature vectors 165. Any known technique can be applied to form the clusters.

Over time, the clusters of similar feature vectors are assigned cluster identifiers to identify a respective one or more interaction event clusters. At step 168, clusters of similar feature vectors 165 are assigned cluster identifiers (e.g., "c01$_{T1}$", "c02$_{T1}$", and "c03$_{T1}$") to identify a respective set of interaction event clusters. The illustrated example indicates that interaction event clusters can overlap (e.g., share one or more common feature vectors or underlying events). An association between the cluster identifiers and the underlying collaboration system interaction events of the respective feature vectors (e.g., in each cluster or cluster) is recorded. As time progresses, more interaction events might be considered and more or fewer or different clusters might be formed. At step 169, additional clusters might be generated from additional sets of collaboration system interaction events (e.g., from a next period) or from a re-application of a clustering technique (e.g., a different clustering technique, the same clustering technique with different constraints, etc.). As a result, the constituency of the formerly generated interaction event clusters 167$_{T1}$ (e.g., "c01$_{T1}$", "c02$_{T1}$", and "c03$_{T1}$") as were calculated at time=T1 might change over time, and thus, a new set of interaction event clusters 167$_{T2}$ might be reconstituted and labeled "c01$_{T2}$", "c02$_{T2}$", and "C03$_{T2}$".

Further details regarding general approaches to generating relationships and/or user-oriented networks between sets of collaboration system interaction events are described in U.S. application Ser. No. 16/051,447 titled "SPONTANEOUS NETWORKING", filed on Jul. 31, 2018, which is hereby incorporated by reference in its entirety.

One embodiment of techniques for presentation of permissions-based collaboration activity (e.g., user events) is disclosed in further detail as follows.

FIG. 2 depicts a permissions-based collaboration activity presentation technique 200 as implemented in systems that facilitate presentation of permissions-based collaboration events. As an option, one or more variations of permissions-based collaboration activity presentation technique 200 or any aspect thereof may be implemented in the context of the architecture and functionality of the embodiments described herein. The permissions-based collaboration activity presentation technique 200 or any aspect thereof may be implemented in any environment.

The permissions-based collaboration activity presentation technique 200 presents one embodiment of certain steps and/or operations that facilitate tracking permissions attributes associated with user collaboration events to generate user-specific permissions-based collaboration activity feeds.

The permissions-based collaboration activity presentation technique 200 can commence by identifying a content management system that manages a plurality of content objects (step 210). For example, the content management system might be a cloud-based shared content platform that stores and provides access to content objects over a distributed computing and storage system. A plurality of users that interact with each other and/or the content objects in accordance with a set of permissions attributes are also identified (step 220). The users might subscribe to the aforementioned content management system to interact with (e.g., create, edit, view, etc.) the content objects as individuals and/or as clusters of collaborators. In all cases, the content management system will consult the permissions attributes associated with the users and/or content objects to determine whether to allow certain interactions. User events that correspond to such permissions-based user-to-user interactions and/or user-content interactions are captured (step 230). As an example, a user event is captured by detecting and recording the event attributes associated with the user event.

For each user from the plurality of users, a set of user events pertaining to the subject user is selected based at least in part on the permissions attributes (step 240). For example, only user events associated with content objects accessible by a subject user (e.g., according to the permissions attributes) will be selected for that subject user. Sets of activity feed entries corresponding to the sets of selected user events are generated (step 250). Such activity feed entries might be human-readable messages that are derived from the event attributes of the corresponding selected user events. These activity feed entries are then filtered and/or ordered for presentation to their respective users (step 260). As an example, the activity feed entries might be sorted before being delivered to a web server for presentation in a browser-based user interface. The specific style of presentation can be specified by a flexible style system such as cascading style sheets. In some cases, the presentation to the subject user is facilitated using a non-browser client such as an "app" or other client application that is native to the user device.

In some cases, user interactions with the presented activity feed entries are detected for learning purposes (step 270). The outcome of this operation is a set of learning outcomes 272 that can be applied to any of the foregoing steps and/or operations and/or processes. As can be observed, the learning outcomes 272 might affect the selection of user events (step 240), the generation of activity feed entries (step 250), the method of filtering, sorting or otherwise organizing the activity feed entries (step 260), and/or other processes.

One embodiment of a system for implementing the permissions-based collaboration activity presentation technique 200 and/or other herein disclosed techniques is disclosed as follows.

Figure 3:
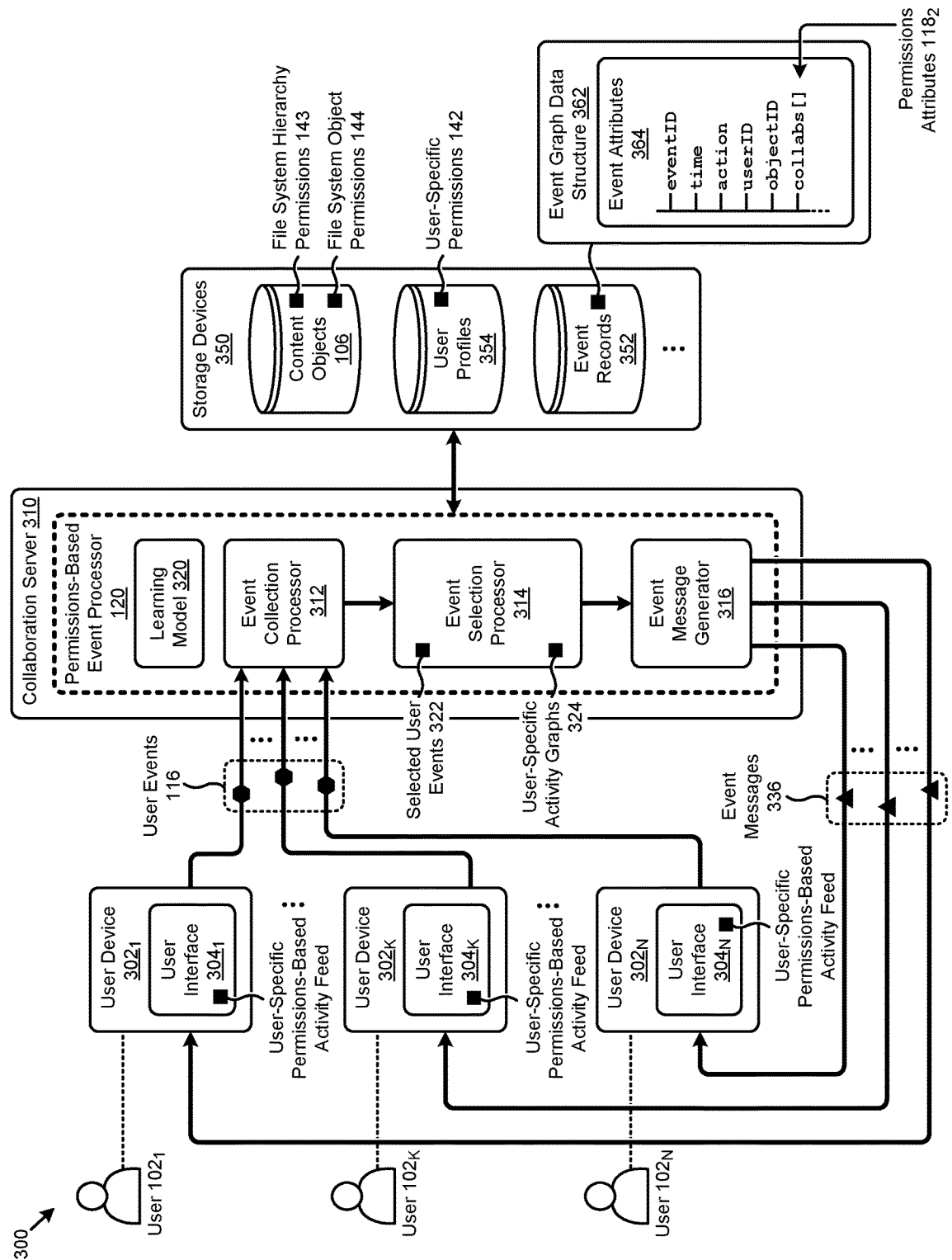
FIG. 3 depicts a computing system used for presentation of permissions-based collaboration events, according to some embodiments.

FIG. 3 depicts a computing system 300 used for presentation of permissions-based collaboration events. As an option, one or more variations of computing system 300 or any aspect thereof may be implemented in the context of the architecture and functionality of the embodiments described herein. The computing system 300 or any aspect thereof may be implemented in any environment.

FIG. 3 illustrates one aspect pertaining to tracking permissions attributes associated with user collaboration events to generate user-specific permissions-based collaboration activity feeds. Specifically, the figure is being presented to show one embodiment of certain representative components, data structures, and associated data flows that described how the herein disclosed techniques might be implemented in a modern computing system. The components, data structures, and data flows shown in FIG. 3 present one partitioning and associated data manipulation approach. The specific example shown is purely exemplary, and other subsystems, data structures, and/or partitioning are reasonable.

As shown, the computing system 300 comprises an instance of the permissions-based event processor 120 operating at an instance of a collaboration server 310. A plurality of instances of the permissions-based event processor 120 might operate at a plurality of instances of the collaboration server 310 in a particular computing system. Such instances can access a set of storage devices 350 that store various information that facilitates operation of the computing system 300 and/or implementation of the herein disclosed techniques. For example, the collaboration server 310 might facilitate access to shared content in content objects 106 by a plurality of users (e.g., user $102_1$, . . . , user $102_K$, . . . , user $102_N$) from a respective set of user devices (e.g., user device $302_1$, . . . , user device $302_K$, . . . , user device $302_N$).

In some cases, the users can interact with user interfaces or application workspaces (e.g., user interface $304_1$, . . . , user interface $304_K$, . . . , user interface $304_N$) at the user devices to generate user events 116 at the computing system 300. The user events 116 are governed by computing system 300 according to various permissions attributes. Such permissions attributes might comprise and/or derive from a set of user-specific permissions 142 in a store of user profiles 354, a set of file system hierarchy permissions 143 and/or file system object permissions 144 in a store of content objects 106, and/or other information (e.g., policy data, etc.). According to the herein disclosed techniques, the permissions attributes associated with the user events 116 are used by permissions-based event processor 120 to deliver instances of event messages 336 that populate a user-specific permissions-based activity feed.

To facilitate the foregoing operations, an event collection processor 312 at the permissions-based event processor 120 can detect the user events 116 invoked by the plurality of users. The event collection processor 312 can codify certain event attributes pertaining to the user events 116 in a set of event records 352 stored in the storage devices 350. In some cases, event collection processor 312 will access a set of user attributes (e.g., user identifiers, etc.) stored in user profiles 354 and/or a set of content object metadata (e.g., content object identifiers, etc.) stored in content objects 106, to facilitate populating the event records 352. As earlier mentioned, various permissions attributes derived from user-specific permissions 142, file system hierarchy permissions 143, file system object permissions 144, any occurrences or aspects of user events 116, and/or other sources may also be accessed to populate the event records 352.

The event records 352 and/or any other data described herein can be organized and/or stored using various techniques. For example, the event records 352 might be organized and/or stored in a tabular structure (e.g., relational database table) that has rows that relate various event objects, such as users or documents, that pertain to a particular user event. As another example, the information might be organized and/or stored in a programming code object that has instances corresponding to a particular user event and properties corresponding to the various attributes (e.g., permissions attributes, event object attributes, etc.) associated with the event. In some cases, any of the foregoing data structures might be logically represented in a graph that comprises nodes (e.g., event objects) and edges (e.g., pairwise relationships between the event objects).

As depicted in FIG. 3, event records 352 is represented by an event graph data structure 362 that comprises instances of event attributes 364. In this case, an event data record (e.g., table row or object instance or graph relationship) for a particular user event might describe an event identifier (e.g., stored in an "eventID" field), an event timestamp (e.g., stored in a "time" field), a description of the interaction type (e.g., stored in an "action" field), an identifier associated with the user (e.g., stored in a "userID" field), an identifier associated with the object accessed by the user (e.g., stored in an "objectID" field), a set of permissions attributes $118_2$ associated with the event objects (e.g., stored in a "collabs [ ]" object), and/or other event attributes. As further indicated in FIG. 3, any combination of the user, the object accessed by the user (e.g., one or more other users, one or more content objects, etc.), or the interaction type can comprise or be associated with one or more instances of event objects that are in turn associated with a particular user. Furthermore, the permissions attributes $118_2$ can be associated with any of the event objects.

An event selection processor 314 at permissions-based event processor 120 can access the event records 352 to select one or more user-specific collections of selected user events 322 for respective subject users. Since the selected user events 322 are codified in event records 352 according to the event graph data structure 362, the user-specific collections of selected user events 322 are represented as instances of user-specific activity graphs 324. As shown, an event message generator 316 operates within the permissions-based event processor 120 to generate event messages 336 that correspond to the selected user events 322.

For example, event message generator 316 can compose an event message from the event attributes of a particular selected user event that comprises a human-readable description of the event (e.g., "John is editing file contract.docx on May 2, 2018"). In some cases, event message generator 316 may apply a display order and/or visual elements (e.g., styling, icons, avatars, animated GIFs, etc.) to the event messages. As an example, the event message in the aforementioned example might include an animated GIF to visually indicate that an ongoing activity (e.g., editing) is associated with that event. Once the event messages 336 are prepared, event message generator 316 exposes (e.g., posts, sends, delivers) the message to be presented in the user-specific activity feeds at the user interfaces of the respective users. In some embodiments, the permissions-based event processor 120 includes a learning model 320. The learning model facilitates machine learning based on user interaction over the presented messages.

Further details regarding general approaches to decorating event messages are described in U.S. application Ser. No. 16/017,838 titled "PRESENTING COLLABORATION ACTIVITY", filed on Jun. 25, 2018, which is hereby incorporated by reference in its entirety.

The foregoing discussions include techniques for recording user events in an event graph data structure (e.g., as performed in the setup operations of FIG. 2). Such techniques are disclosed in further detail as follows.

Figure 4:
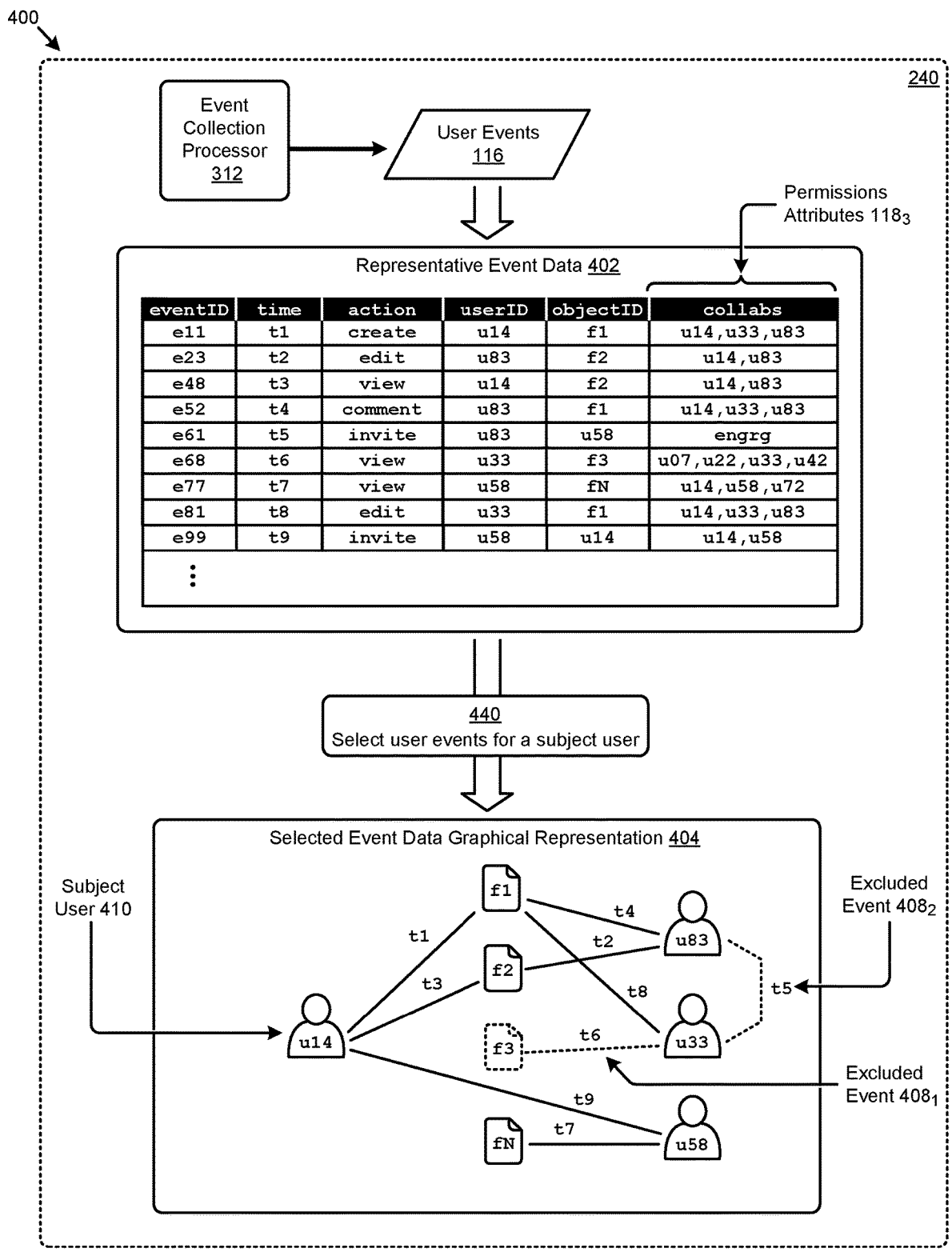
FIG. 4 presents an event attribute data structure as implemented in systems that facilitate presentation of permissions-based collaboration events, according to an embodiment.

FIG. 4 presents an event attribute data structure 400 as implemented in systems that facilitate presentation of permissions-based collaboration events. As an option, one or more variations of event attribute data structure 400 or any aspect thereof may be implemented in the context of the architecture and functionality of the embodiments described herein. The event attribute data structure 400 or any aspect thereof may be implemented in any environment.

FIG. 4 illustrates one aspect pertaining to tracking permissions attributes associated with user collaboration events to generate user-specific permissions-based collaboration activity feeds. Specifically, the figure is being presented to illustrate one embodiment of a specialized data structure for recording and accessing the permissions attributes pertaining to the collaboration events (e.g., user events) so as to facilitate selection of certain user events for the collaboration activity feeds that can be acted upon by the corresponding user.

As shown, a set of representative event data 402 captured from various instances of user events 116 can be organized in a tabular structure. The columns in the shown event data table correspond to the event attributes recorded for each user event depicted in representative event data 402. For example, the representative event data indicates that a user event identified as "e48" corresponds to a user "u14" viewing (e.g., "action"="view") an object "f2" at time "t3". Another event "e99" corresponds to a user "u58" inviting (e.g., "action"="invite") user "u14" (e.g., to join a collaboration group to collaborate on a content object, etc.) at time "t9". As can be observed, the interaction (e.g., identified in the "action" field), the user (e.g., identified in the "userID" field), and the interaction object (e.g., identified in the "objectID" field) comprise the event objects corresponding to a particular event. Furthermore, the information contained in the fields in a "collabs" column constitute the permissions attributes $118_3$ corresponding to a respective event. For example, the permissions attributes corresponding to a user event identified as "e61" indicate this event pertains to an engineering group (e.g., "collabs"="engrg"). The permissions attributes corresponding to another user event identified as "e77" indicate this event pertains to a collection of collaborating users identified as "u14", "u58", and "u72" (e.g., "collabs"="u14, u58, u72").

According to the herein disclosed techniques, accessing the permissions attributes (e.g., permissions attributes $118_3$) of captured user events facilitate a selection of user events that can be acted upon by a subject user (operation 440). Such selected user events can be logically represented in a selected event data graphical representation 404 (e.g., an event graph data structure). As shown, the selected event data graphical representation 404 comprises nodes (e.g., points, vertices, etc.) that correspond to event objects, such as user objects (e.g., "u14", "u83", "u33", and "u58") or content objects (e.g., "f1", "f2", "f3", and "fN"). The edges (e.g., arcs, lines, etc.) between the nodes represent the pairwise relationships between the nodes. Such object relationships can have certain characteristics and/or attributes associated with them. For example, and as indicated in the figure, the object relationships are associated with at least the "time" attribute (e.g., "t1", "t2", "t3", "t4", "t5", "t7", "t8", and "t9") to characterize the time of a user event involving the user objects and/or content objects were acted on as a result of the specific relationship. The object relationships might further be associated with the interaction type (e.g., "create", "edit", "view", "comment", "invite", etc.) of the corresponding user event.

The selected event data graphical representation 404 illustrates how user-specific permissions-based user events might be selected for a particular user. Specifically, with user "u14" as a subject user 410, the user events selected for inclusion in the selected user events for subject user 410 are user events that have user "u14" in their respective permissions attributes (e.g., in the "collabs" field of representative event data 402). Such selected user events are depicted (e.g., with solid lines) in selected event data graphical representation 404. User events that do not identify user "u14" in their respective permissions attributes are excluded from the selected user events as indicated (e.g., with dotted lines) in selected event data graphical representation 404.

The permissions-based selection may be explicit or implicit. As an example of an explicit selection, an excluded event $408_1$ identified as "e68" in representative event data 402 is excluded since user "u14" is not listed in the user list in the "collabs" field associated with that event. An example of an implicit selection pertains to an excluded event $408_2$ identified as "e61". The event is excluded since user "u14" is not a member of the "engrg" group identified in the "collabs" field associated with that event. In this case, another data source (e.g., user profiles) might be accessed to determine that user "u14" is not in the "engrg" group.

Operations or modules that implement the foregoing explicit or implicit selection of events can be configured to make inferences, and those inferences can be used in further processing of recommendations. As examples, event selection can infer that, based on shared activities, a particular first user might want to follow a particular second user. Accordingly, events that arise from activities by the second user might be ranked higher than activities by other users. Conversely, any operations that perform event selection can infer that a particular first user does not want to follow a particular second user. Accordingly, events that arise from activities by the second user might be ranked lower than activities by other users.

The foregoing discussions include techniques for generating event messages from the user-specific permissions-based collaboration events (e.g., step 250 of FIG. 2), which techniques are disclosed in further detail as follows.

Figure 5:
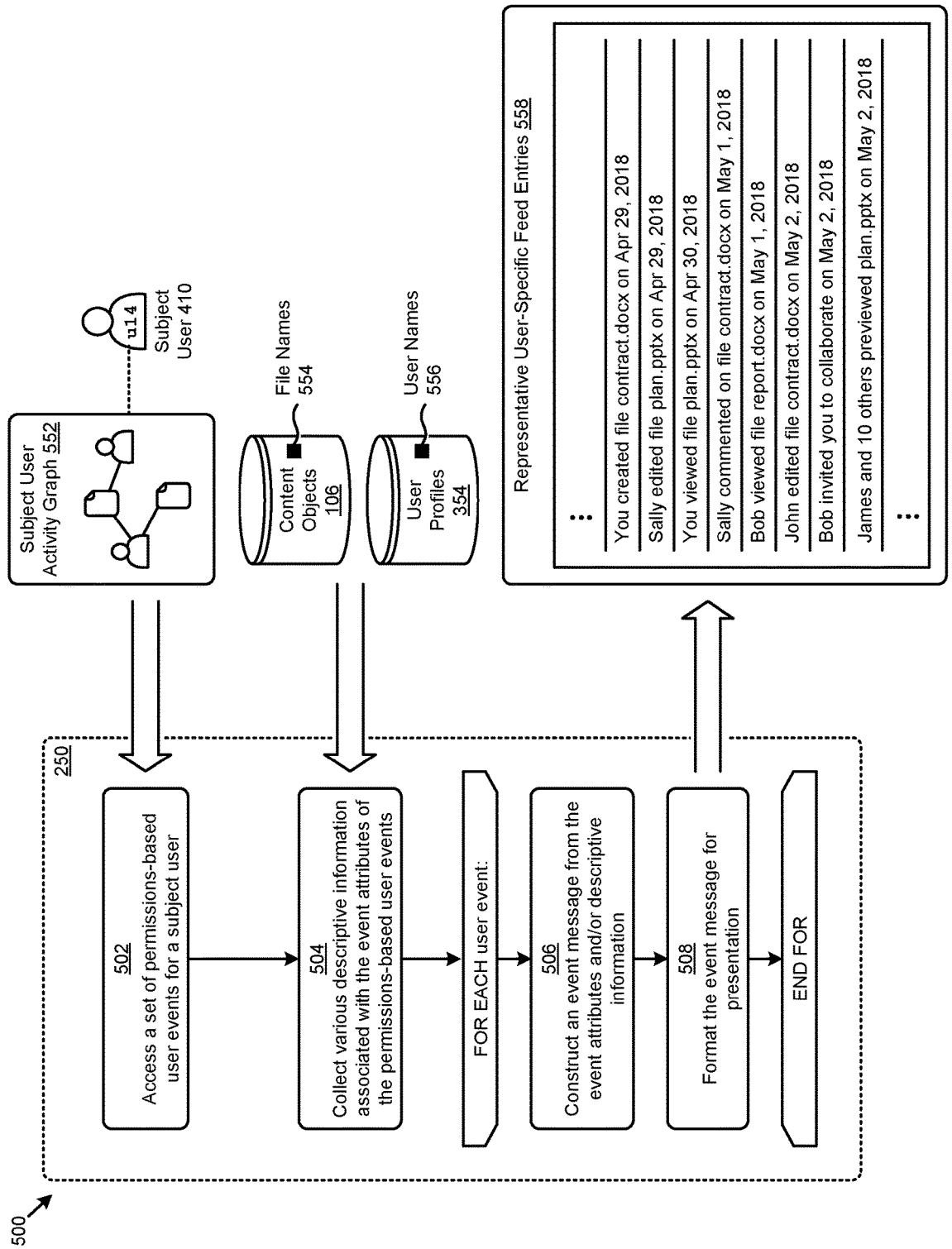
FIG. 5 depicts an event message generation technique as implemented in systems that facilitate presentation of permissions-based collaboration events, according to an embodiment.

FIG. 5 depicts an event message generation technique 500 as implemented in systems that facilitate presentation of permissions-based collaboration events. As an option, one or more variations of event message generation technique 500 or any aspect thereof may be implemented in the context of the architecture and functionality of the embodiments described herein. The event message generation technique 500 or any aspect thereof may be implemented in any environment.

FIG. 5 illustrates one aspect pertaining to tracking permissions attributes associated with user collaboration events to generate user-specific permissions-based collaboration activity feeds. Specifically, the figure is being presented to illustrate one embodiment of certain steps and/or operations for generating human-readable activity feed entries from permissions-based user events selected for a particular subject user.

The event message generation technique 500 shown in FIG. 5 can commence by accessing a set of permissions-based user events selected for a particular subject user (step 502). As illustrated, such selected user events for the subject user 410 (e.g., user "u14") earlier described might be codified in a subject user activity graph 552. Various descriptive information pertaining to the event attributes of the permissions-based user events are collected (step 504). As an example, a set of file names 554 corresponding to any content objects identified in the user events might be collected from a storage facility (e.g., content objects 106) that stores the content objects. Furthermore, a set of user names 556 might be collected from the user profiles 354 of any users associated with the user events. Still further, activities that originate from events that have been raised by users that are more than one degree of separation from the subject user can be collected for further processing. The number of degrees of separation from the subject user can be configured manually by an administrator, or automatically by a process such as the event collection processor 312.

For each user event selected for the subject user (e.g., subject user 410), an event message is constructed from the event attributes and/or description information associated with the user event (step 506). At step 508, a constructed event message is formatted for display to a user. As illustrated, the set of representative user-specific feed entries 558, are human-readable entries derived from underlying user event information. Specifically, the seven entries shown in representative user-specific feed entries 558 correspond to the seven user events (e.g., "e11", "e23", "e48", "e52", "e77", "e81", and "e99") selected from the representative event data 402 for subject user 410 as discussed pertaining to FIG. 4. In some cases, certain message construction logic and/or rules (e.g., for determining verb tense, preposition type and placement, date formatting, etc.) might be implemented to generate the entries. In still other cases, message construction logic and/or rules (e.g., for summarizing events) might be implemented to generate the summary entries. One such summary entry is depicted in representative user-specific feed entries 558, specifically the last entry indicates, "James and 10 others previewed plan.pptx on May 2, 2018".

Further details regarding general approaches to constructing and displaying human-readable entries are described in U.S. application Ser. No. 16/017,838 titled "PRESENTING COLLABORATION ACTIVITY", filed on Jun. 25, 2018, which is hereby incorporated by reference in its entirety.

Also, details regarding general approaches to tracking permissions attributes associated with user collaboration events are described in U.S. application Ser. No. 14/973,518 titled "MANAGING COLLABORATION OF SHARED CONTENT USING COLLABORATOR INDEXING", filed on Dec. 17, 2015, which is hereby incorporated by reference in its entirety.

The foregoing discussions include techniques for exposing a set of user-specific permissions-based activity feed entries for presentation to a subject user (e.g., step 260 of FIG. 2), which techniques are disclosed in further detail as follows.

Figure 6:
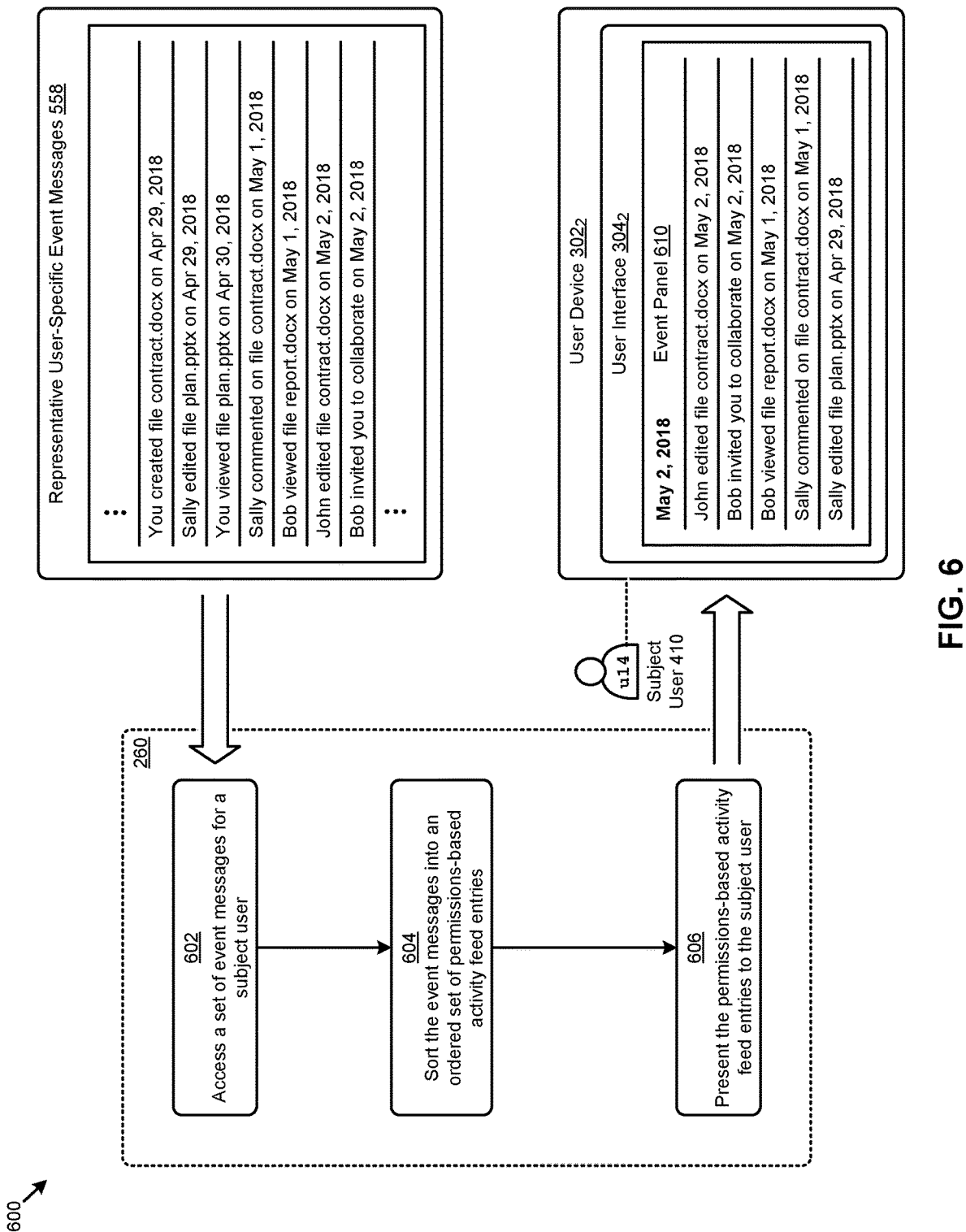
FIG. 6 illustrates an event message presentation technique as implemented in systems that facilitate presentation of permissions-based collaboration events, according to an embodiment.

FIG. 6 illustrates an event message presentation technique 600 as implemented in systems that facilitate presentation of permissions-based collaboration events. As an option, one or more variations of event message presentation technique 600 or any aspect thereof may be implemented in the context of the architecture and functionality of the embodiments described herein. The event message presentation technique 600 or any aspect thereof may be implemented in any environment.

FIG. 6 illustrates one aspect pertaining to tracking permissions attributes associated with user collaboration events to generate user-specific permissions-based collaboration activity feeds. Specifically, the figure is being presented to illustrate one embodiment of certain steps and/or operations for organizing and presenting human-readable event messages in a permissions-based collaboration activity feed for a particular subject user.

The event message presentation technique 600 shown in FIG. 6 can commence by accessing a set of user-specific permissions-based event messages associated with a particular subject user (step 602). As illustrated, such event messages might be the representative user-specific feed entries 558 associated with subject user 410 (e.g., user "u14") earlier described. In this embodiment, the event messages are organized into an ordered set of permissions-based activity feed entries (step 604). Such organization might include operations pertaining to filtering, sorting, decorating, and/or other operations. For example, event messages related to user events invoked by the subject user might be filtered from the activity entries. The remaining entries might then be sorted according to one or more sorting rules (e.g., based on a user event timestamp). The ordered permissions-based activity feed entries are then presented to the subject user (step 606). As can be observed, a certain set of ordered entries might be presented in an event panel 610 of a user interface 304$_2$ at a user device 302$_2$ of subject user 410.

The aforementioned operations pertaining to filtering, sorting, decorating, and/or other operations can be described using rules. In addition to the time-oriented sorting of step 604, entries might be sorted by a probability of interest, and/or on the basis of learning outcomes. For example, if a learning system determines that a user repeatedly hides a particular file from the feed, that file might henceforth be assigned a sorting value lower than other sorting values. As still another illustration of operations pertaining to filtering, sorting, and decorating, entries might be filtered on the basis of any individual privacy setting or combination of privacy settings. Such privacy settings might correspond to folder-level privacy settings, or such privacy settings might correspond to file- or other object-level privacy settings. In some embodiments, a user can specify and selectively enable one or more privacy modes based on individual or combinations of privacy settings. A mode can be selectively enabled or disabled by a user at any time, and/or based on any set of environmental considerations. As such, a user's activities can be subjected to the aforementioned rules to suppress inclusion in other user's feed entries.

In some embodiments, filtering rules themselves and/or sorting rules can be personalized by associating user-specific rules to a particular user and/or his or her environment. In some embodiments the set of actions that are presented to a user to take over a recommended object are personalized by associating user-specific action rules to a particular user and/or his or her environment. Strictly as one example, a user might want to suppress the option to download a file when the user is interacting using a smart watch.

The foregoing discussions include techniques for learning from the interactions of a subject user with the event messages of a respective activity feed (e.g., step 270 of FIG. 2), which techniques are disclosed in further detail as follows.

Figure 7:
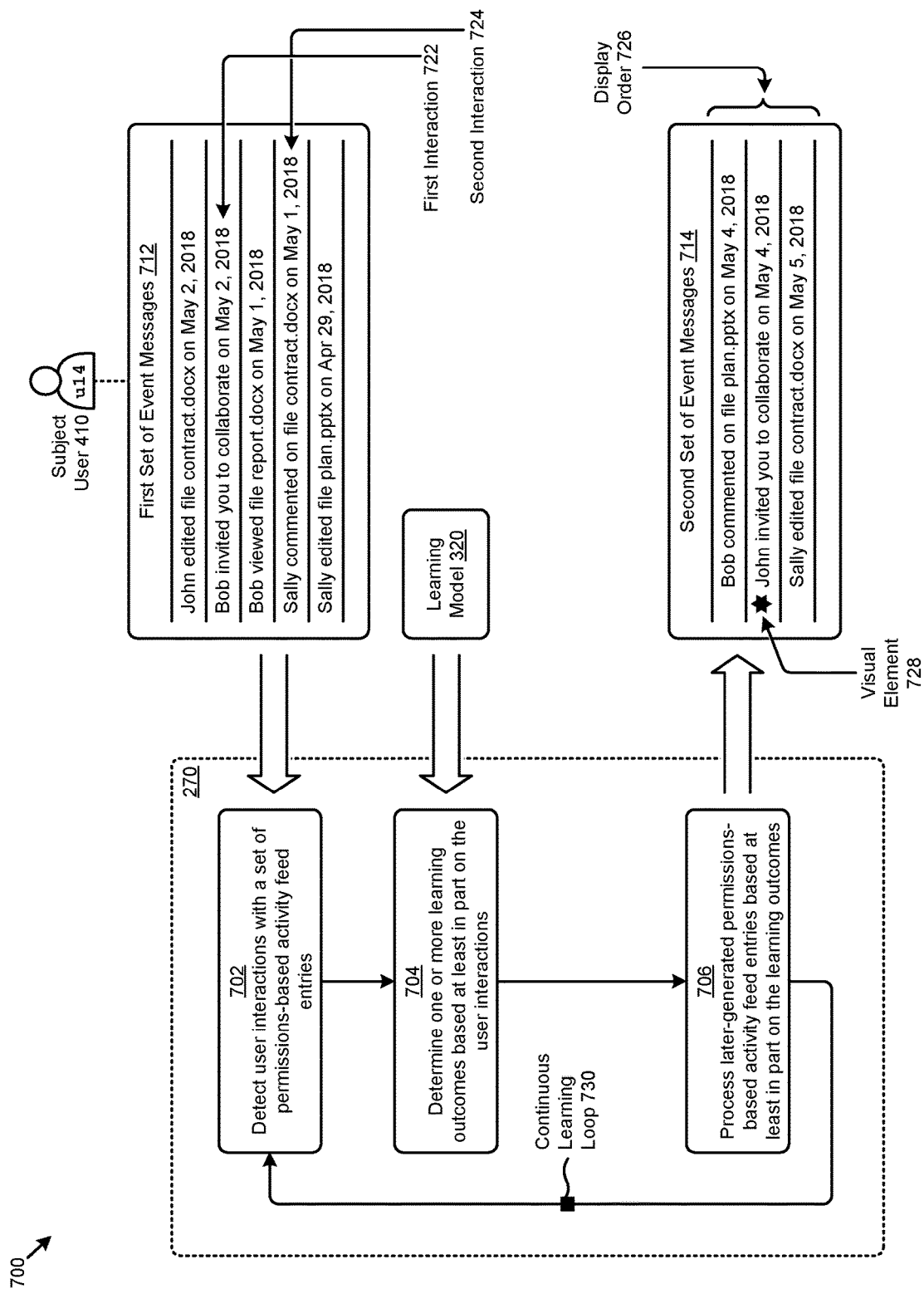
FIG. 7 depicts an event message presentation adjustment technique as implemented in systems that facilitate presentation of permissions-based collaboration events, according to an embodiment.

FIG. 7 depicts an event message presentation adjustment technique 700 as implemented in systems that facilitate presentation of permissions-based collaboration events. As an option, one or more variations of event message presentation adjustment technique 700 or any aspect thereof may be implemented in the context of the architecture and functionality of the embodiments described herein. The event message presentation adjustment technique 700 or any aspect thereof may be implemented in any environment.

FIG. 7 illustrates one aspect pertaining to tracking permissions attributes associated with user collaboration events to generate user-specific permissions-based collaboration activity feeds. Specifically, the figure is being presented to illustrate one embodiment of certain steps and/or operations for applying learning outcomes to adjust any of the processes associated with the herein disclosed techniques, such as the process of organizing and presenting activity feed entries to a particular subject user.

The event message presentation adjustment technique 700 shown in FIG. 7 can commence by detecting user interactions with a set of permissions-based activity feed entries (step 702). As illustrated, such interactions might be between subject user 410 (e.g., user "u14") and a first set of event messages 712 included in the activity feed of subject user 410. Specifically, subject user 410 might perform a first interaction 722 by clicking on the entry "Bob invited you to collaborate on May 2, 2018", and then perform a second interaction 724 by clicking on the entry "Sally commented on file contract.docx on May 1, 2018". Such interactions, including characteristics of the events or collaboration objects that underlie the displayed message are analyzed to determine one or more learning outcomes (step 704). In some cases, the learning outcomes might be generated at least in part by a learning model (e.g., learning model 320).

Such learning models are a collection of mathematical techniques (e.g., algorithms) that facilitate determining (e.g., predicting) a set of outputs (e.g., outcomes, responses) based on a set of inputs (e.g., stimuli). For example, a learning model used to facilitate the event message presentation adjustment technique 700 might consume interaction attributes (e.g., attributes related to timestamps, user device identifiers, event message identifiers, content object types, event attributes, etc.) as inputs to predict a set of processing constraints as learning outcomes. Such interaction attributes might correspond to positive interactions (e.g., a user clicks on an event message) or negative interactions (e.g., a user does not click on an event message). In some cases, the techniques implemented by the model might comprise a set of equations having coefficients that relate one or more of the input variables to one or more of the output variables. In these cases, the equations and coefficients can be determined by a training process (e.g., supervised learning).

When the learning outcomes have been determined, later-generated permissions-based activity feed entries (e.g., formatted event messages) can be processed in accordance with the learning outcomes (step 706). As illustrated, such learning outcomes might affect a display order 726 of the later-generated event messages (e.g., second set of event messages 714), or the display of various visual elements (e.g., visual element 728) with the later-generated event messages. Specifically, the then-current learning outcomes informed the display order 726 to list event messages associated with user comments at the top of the activity feed, followed by event messages associated with user invitations, and so on. Aspects of the learned order might supersede ordering based solely on timestamps of user events. The then-current learning outcomes further result in the visual element 728 being displayed with the invitation event to draw the attention of the user. The learning outcomes can affect any of the processes pertaining to the herein disclosed techniques. As indicated by a continuous learning loop 730, the learning can continually affect such processes.

Additional Embodiments of the Disclosure

Additional Practical Application Examples

Figure 8:
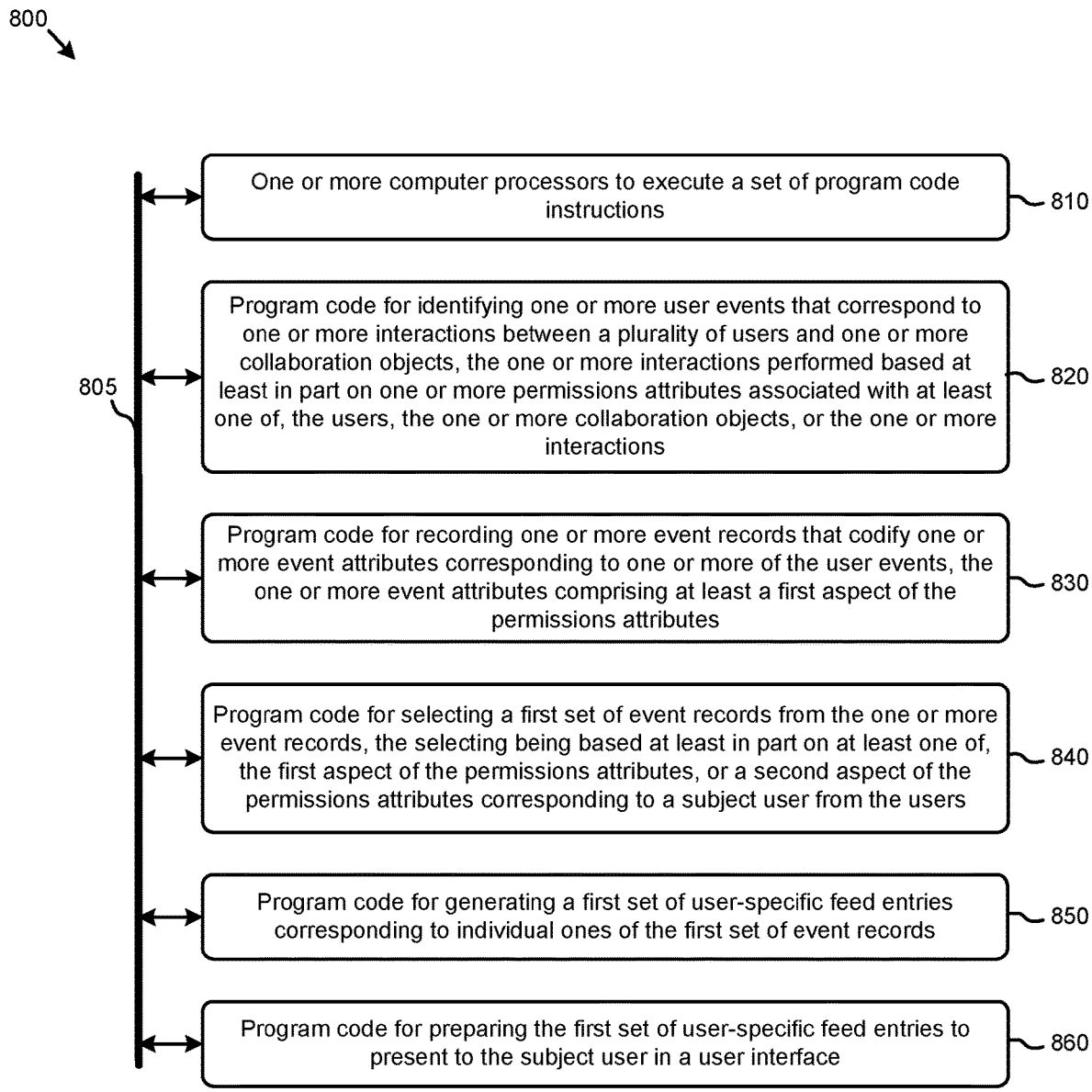
FIG. 8 depict system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually or as combined, serve to form improved technological processes that address presenting collaboration activity to users that have varying collaboration permissions. The partitioning of system 800 is merely illustrative and other partitions are possible. Of course, however, the system 800 or any operation therein may be carried out in any desired environment. The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with any other operations over communication path 805. The modules of the system can, individually or in combination, perform method operations within system 800. Any operations performed within system 800 may be performed in any order unless as may be specified in the claims. The shown embodiment implements a portion of a computer system, presented as system 800, comprising one or more computer processors to execute a set of program code instructions (module 810) and modules for accessing memory to hold program code instructions to perform: identifying one or more user events that correspond to one or more interactions between a plurality of users and one or more collaboration objects, the one or more interactions performed based at least in part on one or more permissions attributes associated with at least one of, the users, the one or more collaboration objects, or the one or more interactions (module 820); recording one or more event records that codify one or more event attributes corresponding to one or more of the user events, the one or more event attributes comprising at least a first aspect of the permissions attributes (module 830); selecting a first set of event records from the one or more event records, the selecting being based at least in part on at least one of, the first aspect of the permissions attributes, or a second aspect of the permissions attributes corresponding to a subject user from the users (module 840); generating a first set of user-specific feed entries corresponding to individual ones of the first set of event records (module 850); and preparing the first set of user-specific feed entries to present to the subject user in a user interface (module 860).

Some embodiments further comprise: detecting one or more user interactions with the first set of event messages; determining one or more learning outcomes, the determining being based at least in part on at least one of the one or more user interactions; and processing a second set of event messages associated with the subject user based at least in part on the one or more learning outcomes.

Some embodiments perform acts wherein the determining of the one or more learning outcomes is based at least in part on a learning model. Some embodiments perform acts wherein the learning outcomes affect at least one of, a display order, or one or more visual elements. Some embodiments further comprise presenting the one or more event messages to the subject user in an event panel of a user interface.

Some embodiments perform acts wherein individual ones of the collaboration objects comprise at least one of, one or more content objects, or one or more of the users. Some embodiments perform acts wherein individual ones of the collaboration objects have a respective set of permissions attributes. Some embodiments perform acts wherein at least one of the permissions attributes is derived from user profiles associated with the users, and/or from a set of access permissions associated with one or more content objects. Some embodiments perform acts wherein the event graph data structure comprises two or more nodes that correspond to two or more objects, and the event graph data structure comprises one or more edges that correspond to one or more relationships between the two or more objects.

Variations of the foregoing may include more or fewer of the shown modules. Certain variations may perform more or fewer (or different) steps and/or certain variations may use data elements in more or in fewer (or different) operations.

System Architecture Overview

Additional System Architecture Examples

Figure 9A:
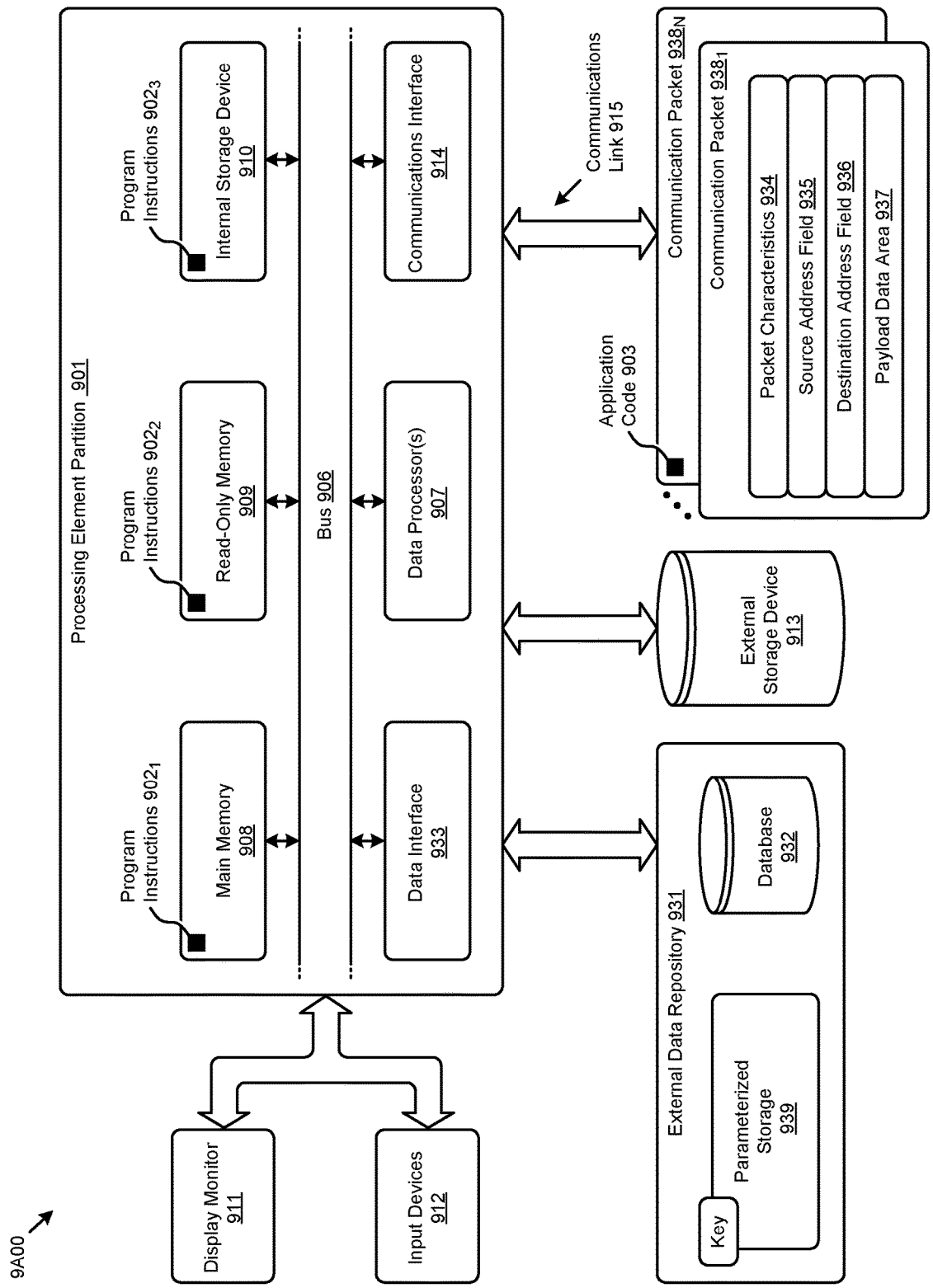
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to presentation of permissions-based collaboration events. A module may include one or more state machines and/or combinational logic used to implement or facilitate the operational and/or performance characteristics pertaining to presentation of permissions-based collaboration events.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of presentation of permissions-based collaboration events). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to presentation of permissions-based collaboration events and/or for improving the way data is manipulated when performing computerized operations pertaining to tracking permissions attributes associated with user collaboration events to generate user-specific permissions-based collaboration activity feeds.

Figure 9B:
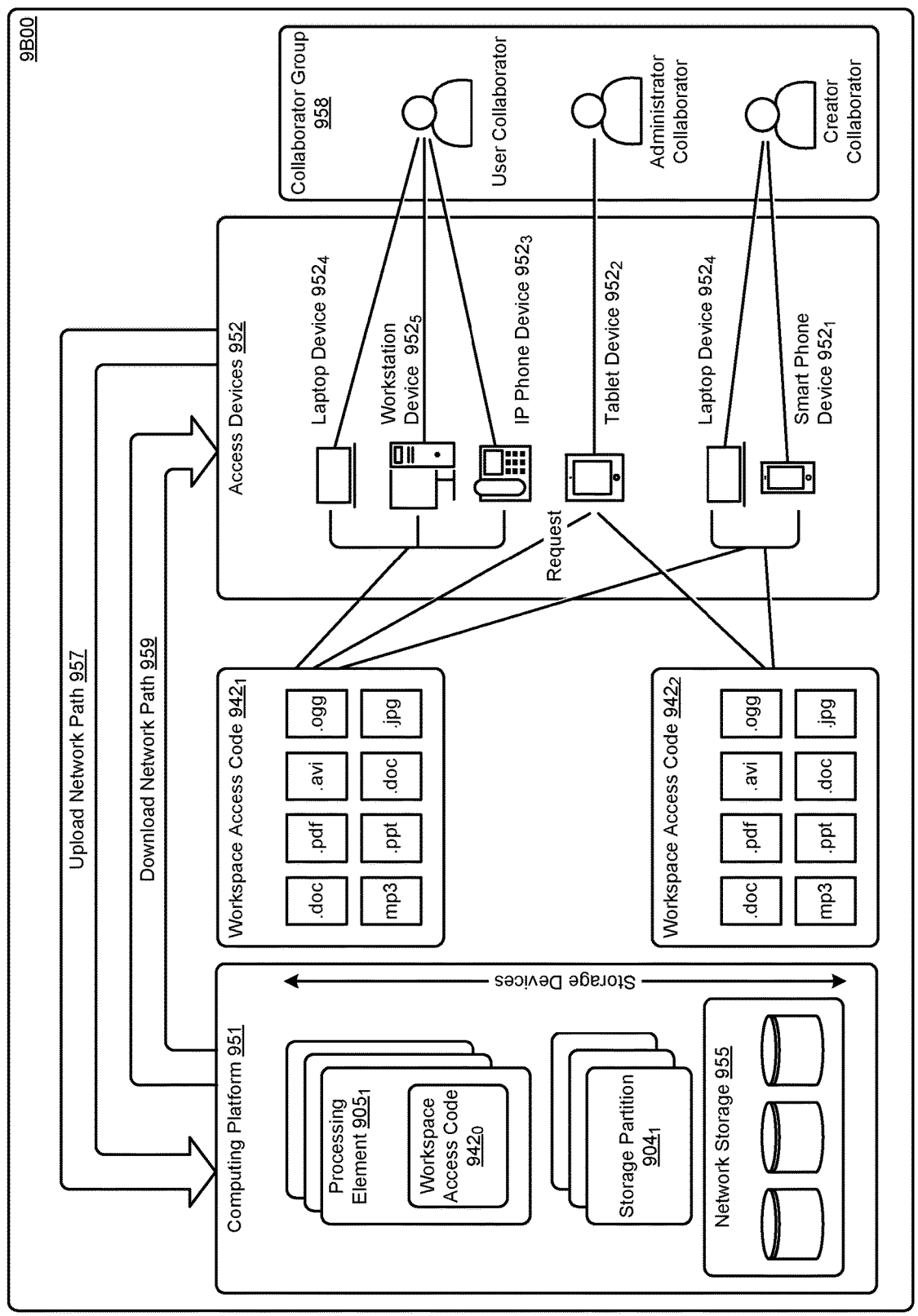

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for presenting collaboration activity to a particular user, the method comprising:
   identifying one or more user events that correspond to interactions between a plurality of users and content objects, wherein the content objects are stored within a content management system, and the plurality of users interacts with the content objects through the content management system;
   recording event records that codify one or more event attributes corresponding to one or more of the one or more user events, wherein an event record of the event records comprises a collaborator field that forms a permission attribute for the event record;
   generating a graph for a user of the plurality of users at least by:
      representing the user as a first node;
      respectively representing one or more content objects as one or more second nodes, wherein the one or more second nodes respectively correspond to one or more permission attributes in one or more collaborator fields of at least one event record of the event records pertaining to the one or more content objects; and
      determining a logical representation for the user and the one or more content objects at least by establishing a respective edge between the first node and the one or more second nodes based at least in part upon the one or more permission attributes pertaining to both the user and the one or more content objects, wherein the one or more second nodes respectively representing the one or more content objects, and the graph is generated specifically for the user;
   identifying a plurality of collaboration activity feed entries pertaining to the content objects on the content management system;
   selecting, for the user, a subset of user-specific feed entries from the plurality of collaboration activity feed entries based at least in part on the graph for the user; and
   preparing the subset of user-specific feed entries to present to the user in a user interface.

2. The method of claim 1, further comprising:
  detecting one or more user interactions with the subset of user-specific feed entries;
  determining one or more learning outcomes based at least in part on at least one of the one or more user interactions; and
  processing an additional subset of user-specific feed entries associated with the user based at least in part on the one or more learning outcomes.

3. The method of claim 2, wherein determining the one or more learning outcomes is based at least in part on a learning model.

4. The method of claim 2, wherein the one or more learning outcomes affects at least one of a display order, or one or more visual elements.

5. The method of claim 1, further comprising:
  presenting the subset of user-specific feed entries to the user in an event panel of the user interface.

6. The method of claim 1, wherein both user-to-user interactions and user-to-content interactions are recorded as collaboration activities within the one or more user events that are recorded, and the event records for both the user-to-user interactions and the user-to-content interactions are used to select a respective set of event records corresponding to the subset of user-specific feed entries presented to the user.

7. The method of claim 1, wherein individual ones of the one or more content objects have a respective set of permissions attributes.

8. The method of claim 1, wherein the one or more permissions attribute is derived from at least one of one or more user profiles associated with the plurality of users, or a set of access permissions associated with at least the one or more content objects.

9. The method of claim 1, wherein the event records are logically represented by at least one event graph data structure.

10. The method of claim 9, wherein the event graph data structure comprises two or more nodes that correspond to two or more content objects of the content objects, and the event graph data structure comprises one or more edges that correspond to one or more relationships between the two or more content objects.

11. A non-transitory computer readable medium having stored thereon a sequence of instructions which, when executed by a processor causes a set of acts for presenting collaboration activity to a particular user, the set of acts comprising:
  identifying one or more user events that correspond to interactions between a plurality of users and content objects, wherein the one or more content objects are stored within a content management system, and the plurality of users interacts with the content objects through the content management system;
  recording event records that codify one or more event attributes corresponding to one or more of the one or more user events, wherein an event record of the event records comprises a collaborator field that forms a permission attribute for the event record;
  generating a graph for a user of the plurality of users at least by:
    representing the user as a first node;
    respectively representing one or more content objects as one or more second nodes, wherein the one or more second nodes respectively correspond to one or more permission attributes in one or more collaborator fields of at least one event record of the event records pertaining to the one or more content objects; and
    determining a logical representation for the user and the one or more content objects at least by establishing a respective edge between the first node and the one or more second nodes based at least in part upon the one or more permission attributes pertaining to both the user and the one or more content objects, wherein the one or more second nodes respectively representing the one or more content objects, and the graph is generated specifically for the user;
  identifying a plurality of collaboration activity feed entries pertaining to the content objects on the content management system;
  selecting, for the user, a first subset of user-specific feed entries from the plurality of collaboration activity feed entries based at least in part on the graph for the user; and
  preparing the first subset of user-specific feed entries to present to the user in a first user interface.

12. The computer readable medium of claim 11, wherein the one or more permissions attributes are derived from at least one of one or more user profiles associated with the plurality of users, or a set of access permissions associated with at least the one or more content objects.

13. The computer readable medium of claim 11, wherein the set of acts further comprise:
  detecting one or more user interactions with the subset of user-specific feed entries;
  determining one or more learning outcomes based at least in part on at least one of the one or more user interactions; and
  processing an additional subset of user-specific feed entries associated with the user based at least in part on the one or more learning outcomes.

14. The computer readable medium of claim 13, wherein determining the one or more learning outcomes is based at least in part on a learning model.

15. The computer readable medium of claim 13, wherein the one or more learning outcomes affects at least one of a display order, or one or more visual elements.

16. The computer readable medium of claim 11, wherein the set of acts further comprise:
  presenting the subset of user-specific feed entries to the first user in an event panel of the user interface.

17. The computer readable medium of claim 11, wherein both user-to-user interactions and user-to-content interactions are recorded as collaboration activities within the one or more user events that are recorded, and the event records for both the user-to-user interactions and the user-to-content interactions are used to select a respective set of event records corresponding to the first set of user-specific feed entries presented to the user.

18. The computer readable medium of claim 11, wherein individual ones of the one or more content objects have a respective set of permissions attributes.

19. A system for presenting collaboration activity to a particular user, the system comprising:
  a storage medium having stored thereon a sequence of instructions; and
  a processor that executes the sequence of instructions to cause a set of acts comprising:
    identifying one or more user events that correspond to interactions between a plurality of users and content objects, wherein the one or more content objects are stored within a content management system and the plurality of users interacts with the content objects through the content management system;

recording event records that codify one or more event attributes corresponding to one or more of the one or more user events, wherein an event record of the event records comprises a collaborator field that forms a permission attribute for the event record;

generating a graph for a user of the plurality of users at least by:
  representing the user as a first node;
  respectively representing one or more content objects as one or more second nodes, wherein the one or more second nodes respectively correspond to one or more permission attributes in one or more collaborator fields of at least one event record of the event records pertaining to the one or more content objects; and
  determining a logical representation for the user and the one or more content objects at least by establishing a respective edge between the first node and the one or more second nodes based at least in part upon the one or more permission attributes pertaining to both the user and the one or more content objects, wherein the one or more second nodes respectively representing the one or more content objects, and the graph is generated specifically for the user;

identifying a plurality of collaboration activity feed entries pertaining to the content objects on the content management system;

selecting, for the user, a subset of user-specific feed entries from the plurality of collaboration activity feed entries based at least in part on the graph for the user;

preparing the subset of user-specific feed entries to present to the user in a user interface.

20. The system of claim 19, wherein the set of acts further comprising:
  detecting one or more user interactions with the subset of user-specific feed entries;
  determining one or more learning outcomes based at least in part on at least one of the one or more user interactions; and
  processing an additional subset of user-specific feed entries associated with the user based at least in part on the one or more learning outcomes.

21. A method for presenting collaboration activity to a particular user of a cloud-based content management platform, the method comprising:
  providing a cloud-based content collaboration platform; and
  providing social media user interface that displays a social media formatted feed, wherein the social media formatted feed comprises one or more file-based recommendations from the cloud-based content management platform, at least by:
    identifying one or more user events that correspond to interactions between a plurality of users and collaboration objects stored within a cloud-based content management platform, wherein event data corresponding to the interactions comprises a collaborator field that forms a permission attribute for the event data;
    generating a file-based recommendation for user of the plurality of users, the file-based recommendation for the user being generated using a graph created for the user based at least in part on a subset of interactions from the interactions, the file-based recommendation being generated at least by:
      representing the user as a first node;
      respectively representing one or more collaboration objects as one or more second nodes, where the one or more second nodes respectively correspond to one or more permission attributes in one or more collaborator fields of the subset of interactions pertaining to the collaboration objects;
      determining a logical representation for the user and the one or more collaboration objects at least by establishing a respective edge between the first node and the one or more second nodes based at least in part upon the one or more permission attributes pertaining to both the user and the one or more collaboration objects,
    identifying the file-based recommendations pertaining to the collaboration objects on the could-based content management system; and
    providing a stream for at least file-based recommendation for the user to the social media user interface, wherein the social media formatted feed is populated with at least the file-based recommendation from the stream.

22. The method of claim 21, wherein the social media formatted feed comprises the one or more file-based recommendations presented in an activity stream component.

23. The method of claim 22, wherein icons within the activity stream component correspond to at least some of the interactions.

24. The method of claim 23, wherein one or more of the at least some of the interactions are transmitted to the cloud-based content collaboration platform.

25. The method of claim 24, further comprising raising an interaction event in the cloud-based content management platform in response to the one or more of the at least some of the interactions transmitted to the cloud-based content collaboration platform.

* * * * *